United States Patent
Sekine

(10) Patent No.: US 9,808,935 B2
(45) Date of Patent: Nov. 7, 2017

(54) ROBOT AND ROBOT SYSTEM

(71) Applicant: Seiko Epson Corporation, Tokyo (JP)

(72) Inventor: Kotaro Sekine, Matsumoto (JP)

(73) Assignee: Seiko Epson Corporation (JP)

( * ) Notice: Subject to any disclaimer, the term of this patent is extended or adjusted under 35 U.S.C. 154(b) by 358 days.

(21) Appl. No.: 14/644,468

(22) Filed: Mar. 11, 2015

(65) Prior Publication Data
US 2015/0266185 A1    Sep. 24, 2015

(30) Foreign Application Priority Data
Mar. 20, 2014 (JP) ................. 2014-057675

(51) Int. Cl.
B25J 13/08    (2006.01)
B25J 9/04    (2006.01)

(52) U.S. Cl.
CPC ............ B25J 13/088 (2013.01); B25J 9/046 (2013.01); *Y10S 901/15* (2013.01); *Y10S 901/46* (2013.01); *Y10T 74/20305* (2015.01)

(58) Field of Classification Search
CPC ................. B25J 13/088; B25J 9/046
See application file for complete search history.

(56) References Cited

U.S. PATENT DOCUMENTS

| | | | |
|---|---|---|---|
| 7,541,764 B2 * | 6/2009 | Takenaka | B25J 13/085 318/568.11 |
| 8,855,823 B2 | 10/2014 | Kirihara | |
| 9,221,174 B2 * | 12/2015 | Negishi | B25J 9/1664 |
| 9,302,389 B2 * | 4/2016 | Asada | B25J 9/06 |
| 9,327,402 B2 * | 5/2016 | Niu | B25J 9/046 |
| 9,327,409 B2 * | 5/2016 | Asada | B25J 13/088 |
| 9,339,930 B2 * | 5/2016 | Niu | B25J 9/06 |
| 9,339,933 B2 * | 5/2016 | Asada | B25J 9/1651 |
| 9,452,529 B2 * | 9/2016 | Niu | B25J 9/1638 |
| 9,498,860 B2 * | 11/2016 | Takahashi | B25J 9/0087 |
| 9,505,129 B2 * | 11/2016 | Yamamoto | B25J 9/1676 |
| 9,533,415 B2 * | 1/2017 | Kamioka | B25J 9/1633 |
| 9,561,592 B1 * | 2/2017 | da Silva | B25J 9/1694 |
| 9,618,937 B1 * | 4/2017 | Blankespoor | G05D 1/021 |
| 2012/0035763 A1 | 2/2012 | Motoyoshi | |
| 2014/0067125 A1 | 3/2014 | Niu | |
| 2014/0371908 A1 | 12/2014 | Kirihara | |

FOREIGN PATENT DOCUMENTS

| | | | |
|---|---|---|---|
| JP | 2011-136395 A | 7/2011 |
| JP | 2012-035361 A | 2/2012 |
| JP | 2012-232370 A | 11/2012 |
| JP | 2013-111718 A | 6/2013 |
| JP | 2014-046405 A | 3/2014 |

* cited by examiner

*Primary Examiner* — David M Fenstermacher
(74) *Attorney, Agent, or Firm* — Harness, Dickey & Pierce, P.L.C.

(57) ABSTRACT

A robot includes a base; a first arm that is provided on the base so as to be able to turn around a first turning axis as the center of turning; a second arm that is provided on the first arm so as to be able to turn around a second turning axis as the center of turning, the direction of which is different from the direction of the first turning axis; and a first member that has a first angular speed detector. When seen from the direction of the second turning axis, at least a part of the first member is provided in a region in which the first arm and the second arm overlap with each other.

11 Claims, 13 Drawing Sheets

ROBOT AND ROBOT SYSTEM

BACKGROUND

1. Technical Field

The present invention relates to a robot and a robot system.

2. Related Art

In a robot disclosed JP-A-2011-136395, a 6-axis sensor is provided at a distal end portion, that is, a sixth link closest to a distal end so as to detect acceleration in the direction of each of X, Y, and Z axes orthogonal to each other, and acceleration around each of the X, Y, and Z axes, and the robot acquires a vibration component of the angular speed of each link around a target axis based on a detection result from the 6-axis sensor, and controls to prevent an occurrence of vibration. A vibration component of the angular speed of a link is referred to as the "torsion of an angular speed" or the "vibration of an angular speed".

In the robot disclosed in JP-A-2011-136395, since the posture of the 6-axis sensor is changed due to a motion of the robot, it is necessary to perform coordinate axis transformation referred to as the Jacobian of a transformation, using a detection result of the 6-axis sensor, and to obtain a vibration component of the angular speed of each link. In addition, it is necessary to perform a calculation process in accordance with the ever-changing rotational angle of a motor.

There is a problem in that a large amount of complicated computational processing is required due to the above-mentioned reasons, and thereby a control device having a high-performance and high-cost central processing unit (CPU) and the like may be required, and costs may increase.

In addition, there is a problem in that a large amount of complicated computational processing is required, and thereby computational errors may be likely to occur, and it may not be possible to satisfactorily prevent an occurrence of vibration due to the computational errors.

SUMMARY

An advantage of some aspects of the invention is to provide a robot and a robot system that can easily and reliably prevent an occurrence of vibration.

The invention can be implemented as the following forms or application examples.

APPLICATION EXAMPLE 1

An aspect of the invention is directed to a robot including: a base; a first arm that is provided on the base so as to be able to turn around a first turning axis as the center of turning; a second arm that is provided on the first arm so as to be able to turn around a second turning axis as the center of turning, the direction of which is different from the direction of the first turning axis; and a first member that has a first angular speed detector, in which when seen from the direction of the second turning axis, at least a part of the first member is provided in a region in which the first arm and the second arm overlap with each other.

Accordingly, it is possible to easily and reliably prevent an occurrence of vibration.

Since the first member is disposed at the above-mentioned position, and the first angular speed detector is disposed on a distal end side of the first arm, it is possible to detect the angular speed of a portion of the first arm via the first angular speed detector, the portion being subjected to large vibration, and thereby it is possible to more reliably prevent an occurrence of vibration.

APPLICATION EXAMPLE 2

In the robot according to the aspect of the invention, it is preferable that the first arm has a first portion that is positioned closer to the base than the second arm, and a second portion that is positioned closer to the second arm than the base, and the first member is provided in the second portion.

With this configuration, since the second portion of the first arm is subjected to vibration greater than the first portion when the second arm turns, it is possible to detect the angular speed of a portion of the first arm via the first angular speed detector, the portion being subjected to large vibration, and thereby it is possible to reliably prevent an occurrence of vibration.

APPLICATION EXAMPLE 3

In the robot according to the aspect of the invention, it is preferable that a speed reducer is provided in the second portion.

With this configuration, since the second portion is subjected to large vibration when the second arm turns, it is possible to detect the angular speed of a portion of the first arm via the first angular speed detector, the portion being subjected to large vibration, and thereby it is possible to reliably prevent an occurrence of vibration.

APPLICATION EXAMPLE 4

In the robot according to the aspect of the invention, it is preferable that the first portion and the second arm do not overlap with each other when seen from the direction of the second turning axis, and when seen from the direction of the second turning axis, the first member is provided in the second portion so as not to overlap the first portion.

With this configuration, it is possible to detect the angular speed of a portion of the first arm via the first angular speed detector, the portion being subjected to large vibration, and thereby it is possible to reliably prevent an occurrence of vibration.

APPLICATION EXAMPLE 5

In the robot according to the aspect of the invention, it is preferable that the robot further includes a third arm that is provided on the second arm so as to be able to turn around a third turning axis as the center of turning, which is parallel with the second turning axis; and a second member that is provided on the third arm, and has a second angular speed detector.

With this configuration, it is possible to detect the angular speed of the first arm via the first angular speed detector. Since the third turning axis is parallel with the second turning axis, it is possible to detect the angular speed of the third arm, which includes an angular speed associated with a turning of the second arm, via the second angular speed detector. It is possible to prevent an occurrence of vibration based on these detection results.

In addition, since the second angular speed detector does not detect the angular speed of the second arm, but detects the angular speed of the third arm, which includes an angular speed associated with a turning of the second arm, it is possible to more reliably prevent an occurrence of vibration.

Compared to when an angular speed detector is also provided in the second arm, it is possible to reduce the number of angular speed detectors to be installed and to reduce costs, and the configuration can be simplified.

APPLICATION EXAMPLE 6

In the robot according to the aspect of the invention, it is preferable that an angular speed detecting axis of the second angular speed detector is parallel with the third turning axis.

With this configuration, it is possible to easy and reliably detect the angular speed of the third arm.

Even when the posture of the robot is changed, for example, the second arm turns, or the third arm turns, the direction of the angular speed detecting axis of the second angular speed detector remains constant. For this reason, it is not necessary to correct the angular speed (the angular speed being detected by the second angular speed detector) of the third arm for a change in the orientation of the second angular speed detector.

APPLICATION EXAMPLE 7

In the robot according to the aspect of the invention, it is preferable that an angular speed detecting axis of the first angular speed detector is parallel with the first turning axis.

With this configuration, it is possible to easily and reliably detect the angular speed of the first arm.

Even when the posture of the robot is changed, the direction of the angular speed detecting axis of the first angular speed detector remains constant. For this reason, it is not necessary to correct the angular speed (the angular speed being detected by the first angular speed detector) of the first arm for a change in the orientation of the first angular speed detector.

APPLICATION EXAMPLE 8

In the robot according to the aspect of the invention, it is preferable that the first member is disposed inside the first arm.

With this configuration, it is possible to protect the first angular speed detector, and it is possible to improve the reliability and the durability of the first angular speed detector.

APPLICATION EXAMPLE 9

In the robot according to the aspect of the invention, it is preferable that the second turning axis is orthogonal to the first turning axis, or is parallel with an axis orthogonal to the first turning axis.

With this configuration, it is possible to easily control the operation of the robot.

APPLICATION EXAMPLE 10

In the robot according to the aspect of the invention, it is preferable that, when seen from the direction of the first turning axis, the second turning axis is disposed at a position offset from the first turning axis.

With this configuration, it is possible to broaden the movable range of the robot.

APPLICATION EXAMPLE 11

In the robot according to the aspect of the invention, it is preferable that the robot further includes a fourth arm that is provided on the third arm so as to be able to turn around a fourth turning axis as the center of turning, which is orthogonal to the third turning axis, or is parallel with an axis orthogonal to the third turning axis; a fifth arm that is provided on the fourth arm so as to be able to turn around a fifth turning axis as the center of turning, which is orthogonal to the fourth turning axis, or is parallel with an axis orthogonal to the fourth turning axis; and a sixth arm that is provided on the fifth arm so as to be able to turn around a sixth turning axis as the center of turning, which is orthogonal to the fifth turning axis, or is parallel with an axis orthogonal to the fifth turning axis.

With this configuration, the robot can easily handle a more complicated motion.

APPLICATION EXAMPLE 12

Another aspect of the invention is directed to a robot system including: a robot; and a robot control device that controls the operation of the robot, in which the robot includes a base, a first arm that is provided on the base so as to be able to turn around a first turning axis as the center of turning, a second arm that is provided on the first arm so as to be able to turn around a second turning axis as the center of turning, the direction of which is different from the direction of the first turning axis, and a member that has an angular speed detector, in which when seen from the direction of the second turning axis, at least a part of the member is provided in a region in which the first arm and the second arm overlap with each other.

With this configuration, it is possible to easily and reliably prevent an occurrence of vibration.

Since the member is disposed at the above-mentioned position, and the angular speed detector is disposed on a distal end side of the first arm, it is possible to detect the angular speed of a portion of the first arm via the angular speed detector, the portion being subjected to large vibration, and thereby it is possible to more reliably prevent an occurrence of vibration.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
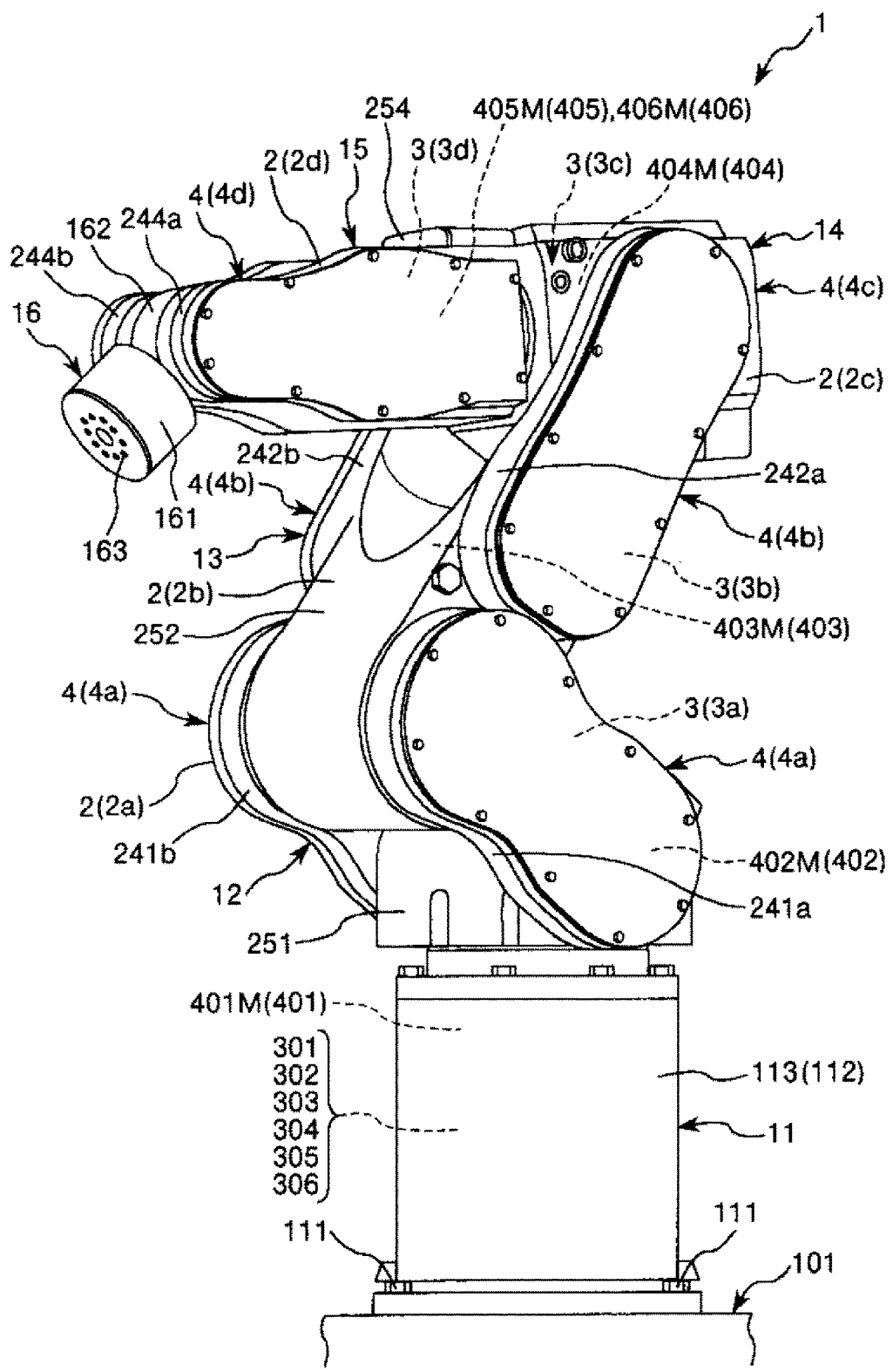
FIG. 1 is a perspective front side angle view of a robot according to an embodiment of the invention.
Figure 2:
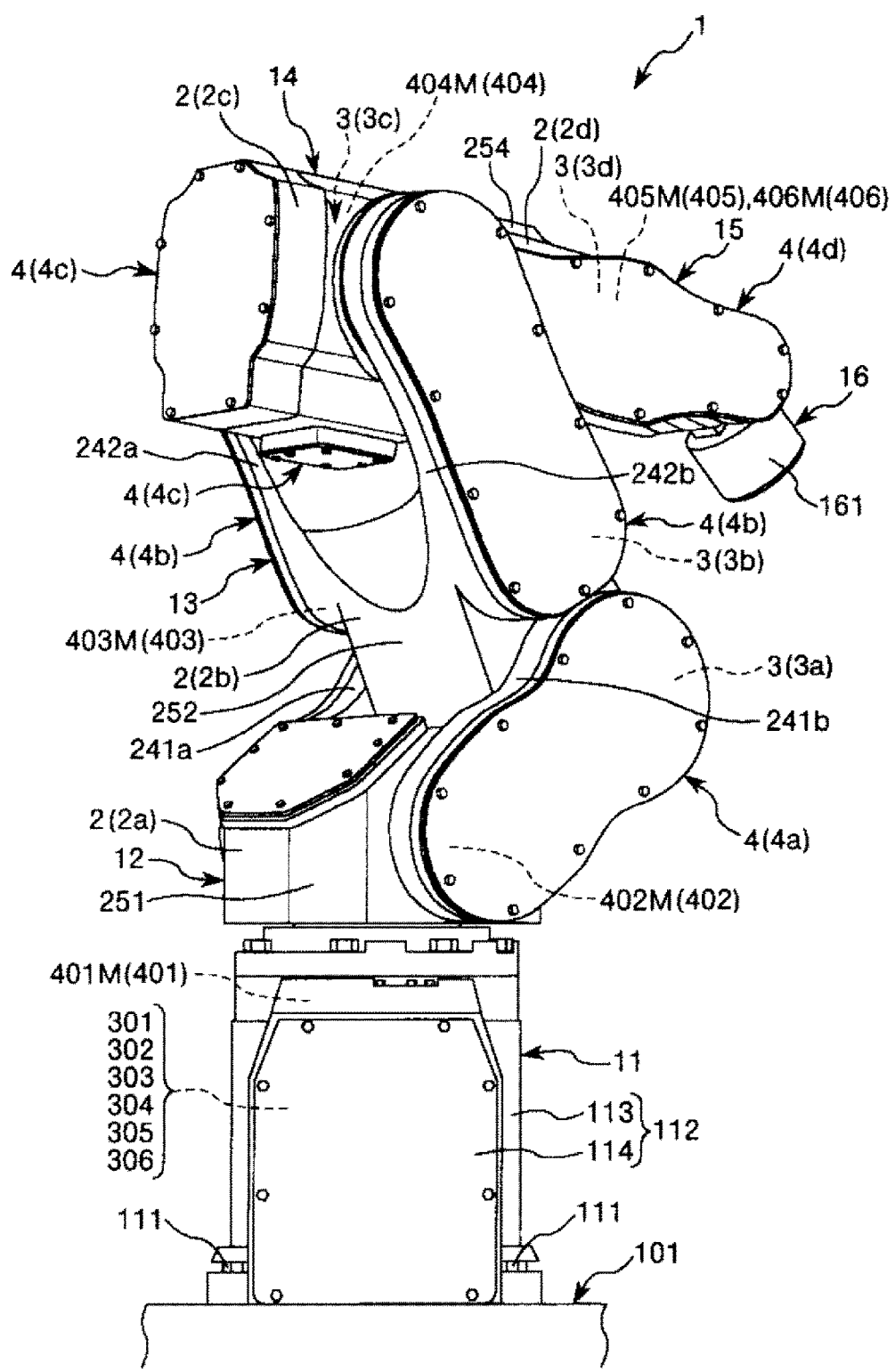
FIG. 2 is a perspective back side angle view of the robot illustrated in FIG. 1.
Figure 3:
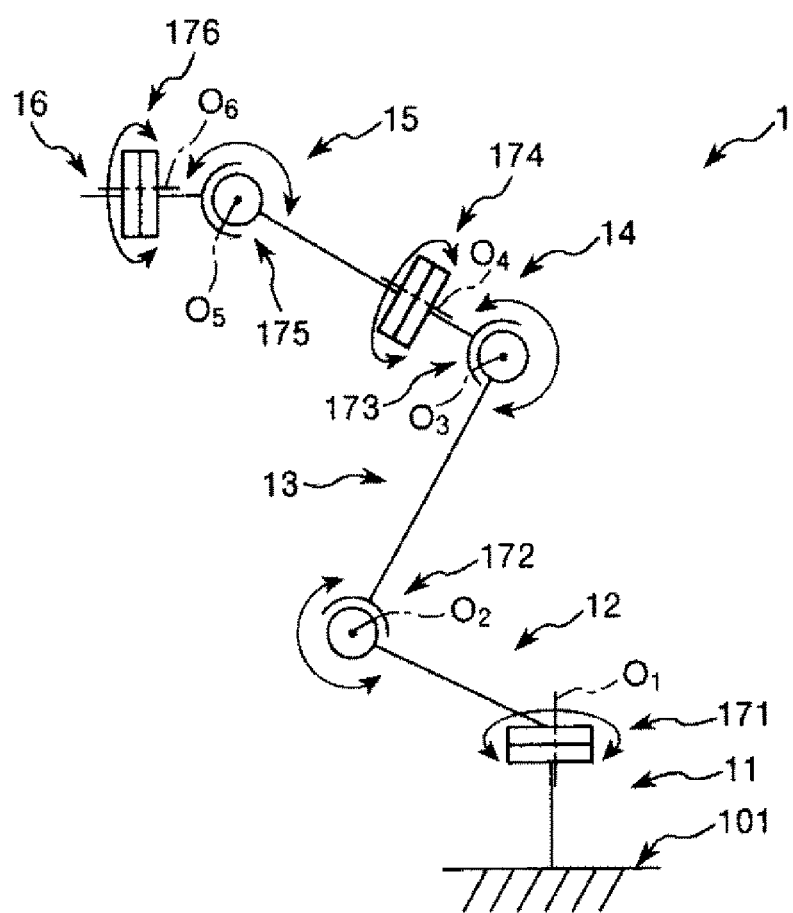
FIG. 3 is a schematic view of the robot illustrated in FIG. 1.
Figure 4:
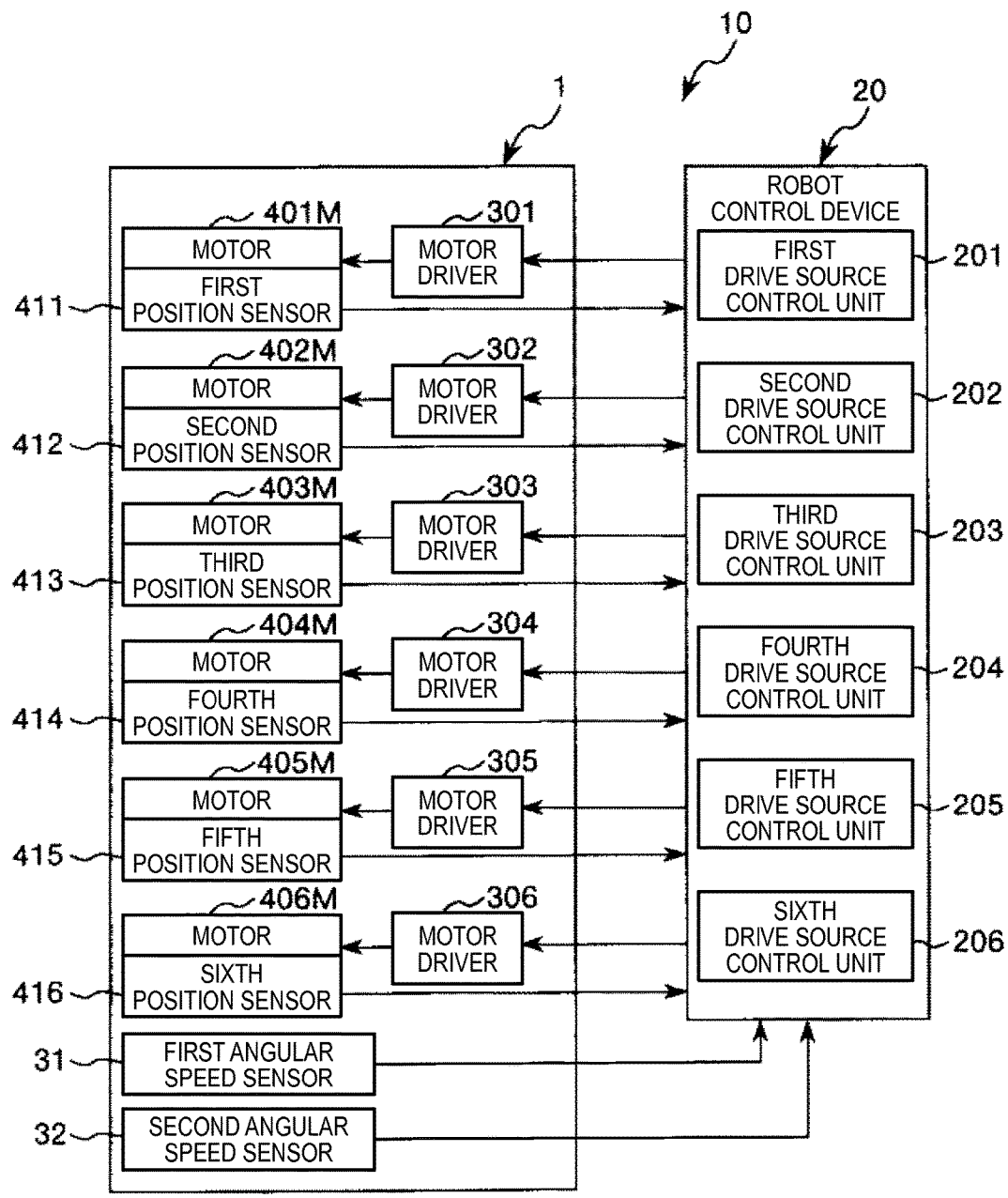
FIG. 4 is a block diagram illustrating the main portions of a robot system including the robot illustrated in FIG. 1.
Figure 5:
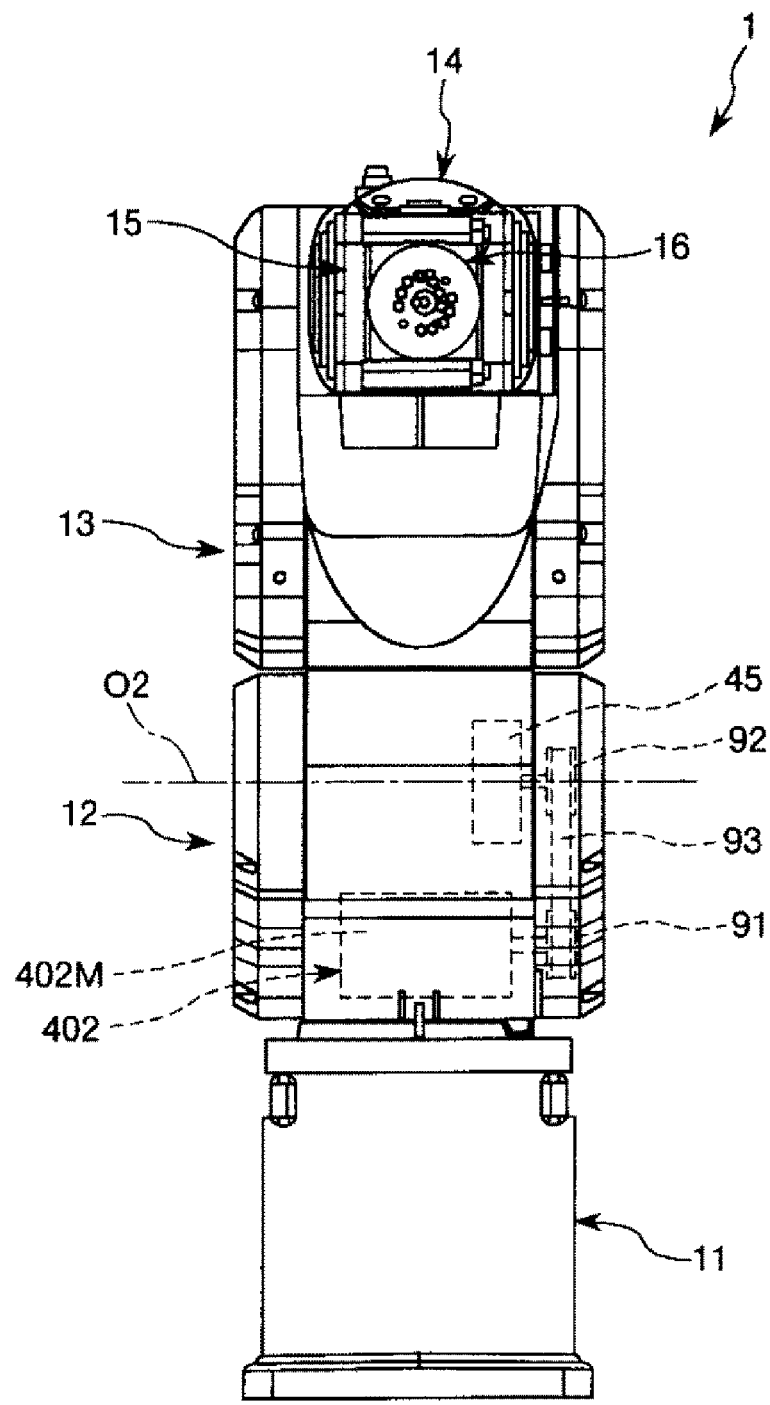
FIG. 5 is a front view of the robot illustrated in FIG. 1.
Figure 6:
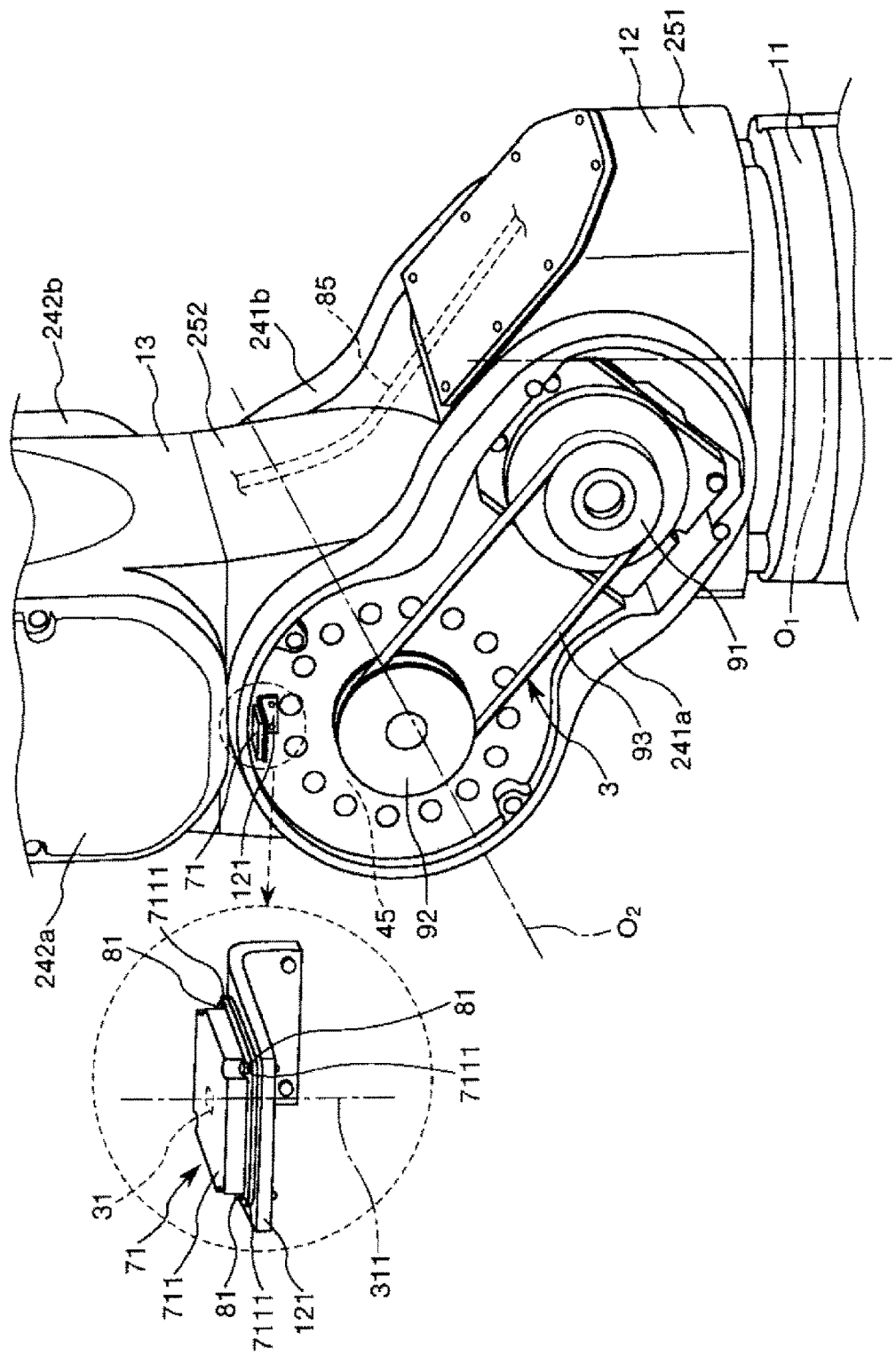
FIG. 6 is a view illustrating the vicinity of a first angular speed sensor in a first arm of the robot illustrated in FIG. 1.
Figure 7:
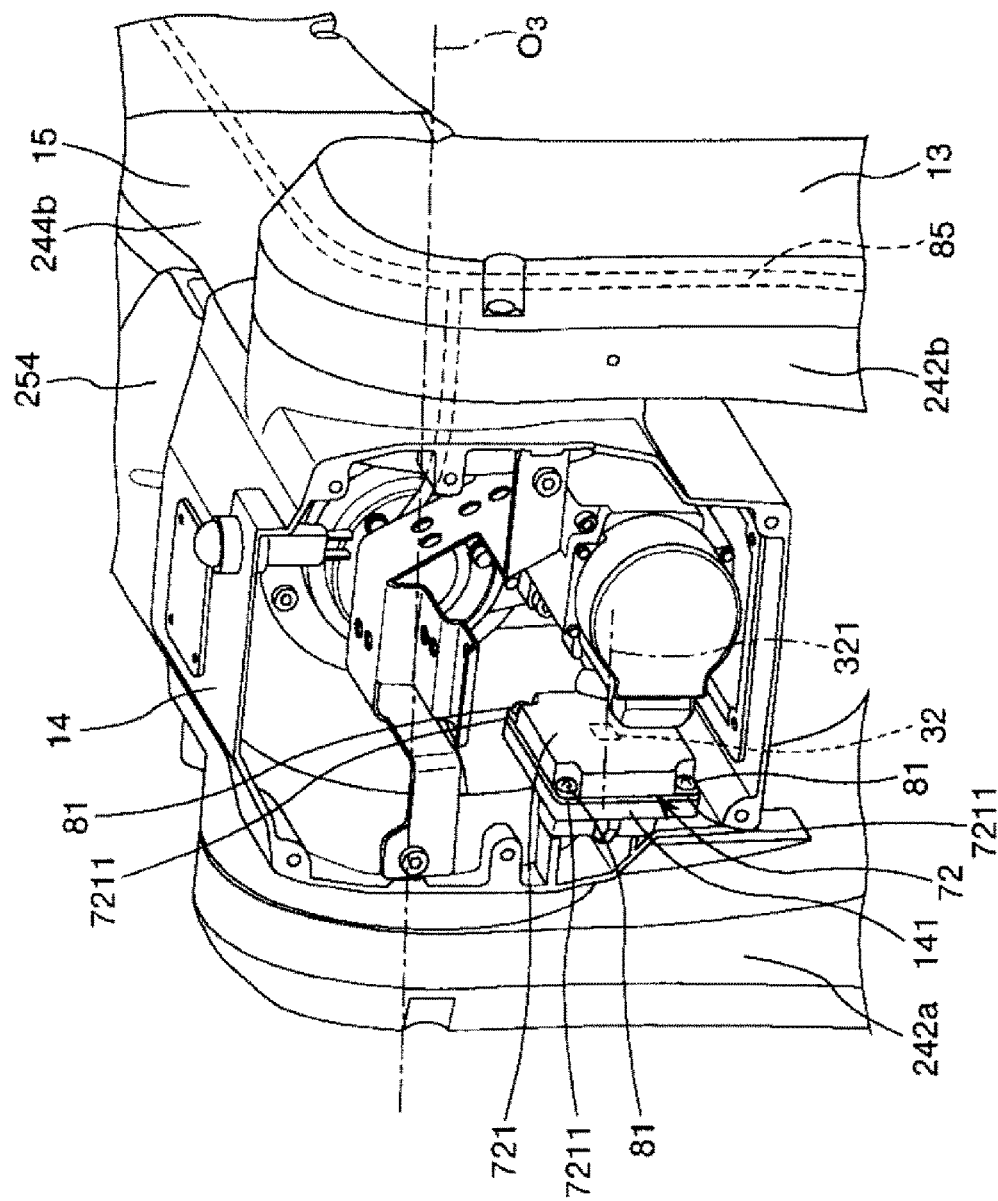
FIG. 7 is a view illustrating the vicinity of a second angular speed sensor in a third arm of the robot illustrated in FIG. 1.
Figure 8:
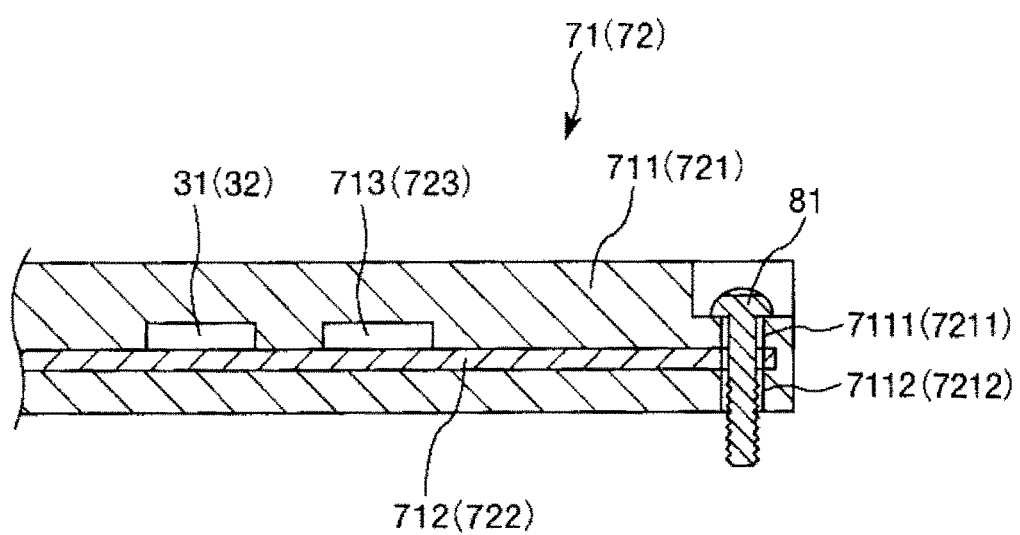
FIG. 8 is a cross-sectional view of a first angular speed sensor unit of the robot illustrated in FIG. 1.
Figure 9:
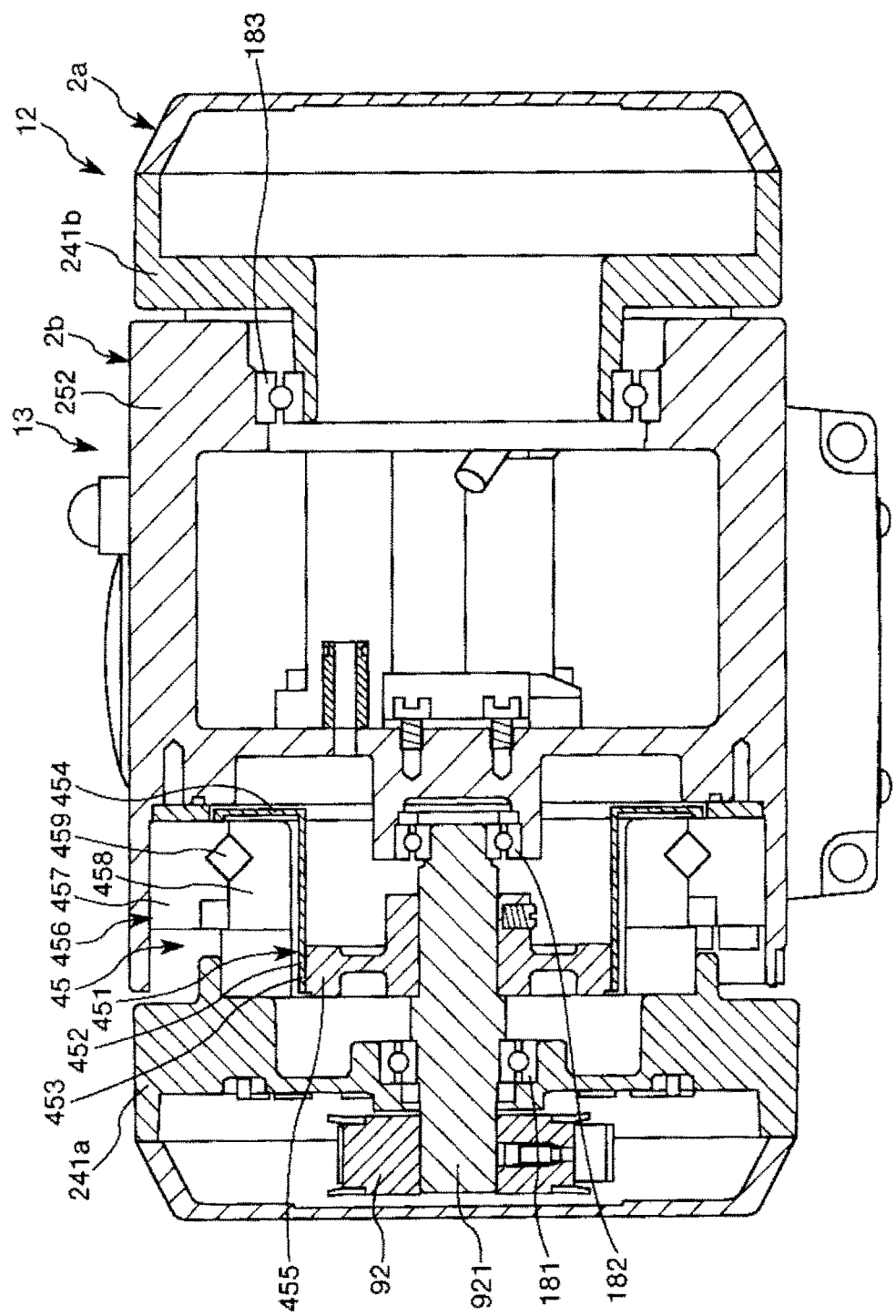
FIG. 9 is a cross-sectional view illustrating the vicinity of a speed reducer of a drive source for driving a second arm of the robot illustrated in FIG. 1.

Hereinafter, a preferred embodiment of a robot and a robot system according to the invention will be described in detail with reference to the accompanying drawings. FIG. 1 is a perspective front side angle view of the robot according to the embodiment of the invention. FIG. 2 is a perspective back side angle view of the robot illustrated in FIG. 1. FIG. 3 is a schematic view of the robot illustrated in FIG. 1. FIG. 4 is a block diagram illustrating the main portions of the robot system including the robot illustrated in FIG. 1. FIG. 5 is a front view of the robot illustrated in FIG. 1. FIG. 6 is a view illustrating the vicinity of a first angular speed sensor in a first arm of the robot illustrated in FIG. 1. FIG. 7 is a view illustrating the vicinity of a second angular speed sensor in a third arm of the robot illustrated in FIG. 1. FIG. 8 is a cross-sectional view of a first angular speed sensor unit of the robot illustrated in FIG. 1. FIG. 9 is a cross-sectional view illustrating the vicinity of a speed reducer of a drive source for driving a second arm of the robot illustrated in FIG. 1. FIGS. 10 to 14 are block diagrams illustrating the main portions of the robot illustrated in FIG. 1.

Hereinafter, for descriptive purposes, in FIGS. 1 to 3, and FIGS. 5 to 7, an upper side may be referred to as a "top" or an "upper portion", and a lower side may be referred to as a "bottom" or a "lower portion". In FIGS. 1 to 3, and FIGS. 5 to 7, a side close to a base may be referred to as a "proximal end", and an opposite side far away from the base may be referred to as a "distal end". In FIG. 9, a right side may be referred to as the "right", and a left side may be referred to as the "left". In FIG. 8, the reference numeral of each portion of a second angular speed sensor unit, corresponding to that of the first angular speed sensor unit, is written in a parenthesis, and the second angular speed sensor unit is not illustrated.

A robot system (an industrial robot system) 10 illustrated in FIGS. 1 to 4 can be used in a process of manufacturing precision equipment such as a wrist watch, and has a robot (an industrial robot) 1, and a robot control device (control means) 20 (refer to FIG. 4) for controlling the operation of the robot 1. The robot 1 and the robot control device 20 are electrically connected to each other. For example, the robot control device 20 can be configured by a personal computer (PC) including a built-in central processing unit (CPU) or the like. The robot control device 20 will be described in detail later.

The robot 1 includes a base 11; four arms (links) 12, 13, 14, and 15; a wrist (a link) 16; and six drive sources 401, 402, 403, 404, 405, and 406. The robot 1 is a vertical articulated (six axes) robot (a robot main body) in which the base 11, the arms 12, 13, 14, and 15, and the wrist 16 are connected to each other in sequence from a proximal end side to a distal end side. In the vertical articulated robot, the base 11, the arms 12, 13, 14, and 15, and the wrist 16 can be referred to as an "arm" as a collective term, and the arms 12, 13, 14, and 15, and the wrist 16 can be respectively referred to as a "first arm", a "second arm", a "third arm", a "fourth arm", and "fifth and sixth arms" as collective terms. In the embodiment, the wrist 16 has the fifth arm and the sixth arm. An end effector or the like can be attached to the wrist 16.

The arms 12 to 15, and the wrist 16 are supported in such a manner to be able to be independently displaced with respect to the base 11. The length of each of the arms 12 to 15 and the wrist 16 are not particularly limited; however, in the configuration illustrated in the drawings, the length of each of the first arm 12, the second arm 13, and the fourth arm 15 is set to be longer than that of each of the third arm 14 and the wrist 16.

The base 11 and the first arm 12 are connected to each other via a joint 171. The first arm 12 can turn with respect to the base 11 around a first turning axis O1 that is the center of turning and is parallel with a vertical direction. The first turning axis O1 coincides with the normal line of an upper surface of a bed 101, which is an installation surface for the base 11. Turning around the first turning axis O1 is realized by driving a first drive source 401 having a motor 401M. The first drive source 401 is driven by the motor 401M and a cable (not illustrated), and the motor 401M is controlled by the robot control device 20 via a motor driver 301 that is electrically connected to the motor 401M (refer to FIG. 4). The first drive source 401 may be configured to transmit a drive force from the motor 401M via a speed reducer (not illustrated) that is provided along with the motor 401M, or the speed reducer may not be provided. In the embodiment, the first drive source 401 has a speed reducer.

The first arm 12 and the second arm 13 are connected to each other via a joint 172. The second arm 13 can turn with respect to the first arm 12 around a second turning axis O2 (the center of an axis) parallel with the horizontal direction. The second turning axis O2 is parallel with an axis orthogonal to the first turning axis O1. That is, the second turning axis O2 is disposed at a position offset from the first turning axis O1, when seen from the direction of the first turning axis O1. Turning around the second turning axis O2 is realized by driving a second drive source 402 having a motor 402M. The second drive source 402 is driven by the motor 402M and a cable (not illustrated), and the motor 402M is controlled by the robot control device 20 via a motor driver 302 that is electrically connected to the motor 402M (refer to FIG. 4). The second drive source 402 may be configured to transmit a drive force from the motor 402M via a speed reducer (not illustrated) that is provided along with the motor 402M, or the speed reducer may not be provided. In the embodiment, the second drive source 402 has a speed reducer 45 (refer to FIGS. 5 and 9). The second turning axis O2 may be orthogonal to the first turning axis O1. Insofar as the direction of the second turning axis O2 is different from that of the first turning axis O1, the second turning axis O2 may be configured differently from the above-mentioned configuration. That is, preferably, the second turning axis O2 is not parallel with the first turning axis O1, and does not coincide with the first turning axis O1.

The second arm 13 and the third arm 14 are connected to each other via a joint 173. The third arm 14 can turn with respect to the second arm 13 around a third turning axis O3 (the center of turning) parallel with the horizontal direction. The third turning axis O3 is parallel with the second turning axis O2. Turning around the third turning axis O3 is realized by driving a third drive source 403. The third drive source 403 is driven by a motor 403M and a cable (not illustrated), and the motor 403M is controlled by the robot control device 20 via a motor driver 303 that is electrically connected to the motor 403M (refer to FIG. 4). The third drive source 403 may be configured to transmit a drive force from the motor 403M via a speed reducer (not illustrated) that is provided along with the motor 403M, or the speed reducer may not be provided. In the embodiment, the third drive source 403 has a speed reducer.

The third arm 14 and the fourth arm 15 are connected to each other via a joint portion (a joint) 174. The fourth arm 15 can turn with respect to the third arm 14 (the base 11) around a fourth turning axis O4 (the center of turning) parallel with the direction of the center axis of the third arm 14. The fourth turning axis O4 is orthogonal to the third turning axis O3. Turning around the fourth turning axis O4 is realized by driving a fourth drive source 404. The fourth drive source 404 is driven by a motor 404M and a cable (not illustrated), and the motor 404M is controlled by the robot control device 20 via a motor driver 304 that is electrically connected to the motor 404M (refer to FIG. 4). The fourth drive source 404 may be configured to transmit a drive force from the motor 404M via a speed reducer (not illustrated) that is provided along with the motor 404M, or the speed reducer may not be provided. In the embodiment, the fourth drive source 404 has a speed reducer. The fourth turning axis O4 may be parallel with an axis orthogonal to the third turning axis O3.

The fourth arm 15 and the wrist 16 are connected to each other via a joint 175. The wrist 16 can turn with respect to the fourth arm 15 around a fifth turning axis O5 (the center of turning) parallel with the horizontal direction (in a Y-axis direction). The fifth turning axis O5 is orthogonal to the fourth turning axis O4. Turning around the fifth turning axis O5 is realized by driving a fifth drive source 405. The fifth drive source 405 is driven by a motor 405M and a cable (not illustrated), and the motor 405M is controlled by the robot control device 20 via a motor driver 305 that is electrically connected to the motor 405M (refer to FIG. 4). The fifth drive source 405 may be configured to transmit a drive force from the motor 405M via a speed reducer (not illustrated) that is provided along with the motor 405M, or the speed reducer may not be provided. In the embodiment, the fifth drive source 405 has a speed reducer. The wrist 16 can turn around a sixth turning axis O6 (the center of turning) orthogonal to the fifth turning axis O5 via the joint 176. The turning axis O6 is orthogonal to the turning axis O5. Turning around the sixth turning axis O6 is realized by driving a sixth drive source 406. The sixth drive source 406 is driven by a motor 406M and a cable (not illustrated), and the motor 406M is controlled by the robot control device 20 via a motor driver 306 that is electrically connected to the motor 406M (refer to FIG. 4). The sixth drive source 406 may be configured to transmit a drive force from the motor 406M via a speed reducer (not illustrated) that is provided along with the motor 406M, or the speed reducer may not be provided. In the embodiment, the sixth drive source 406 has a speed reducer. The fifth turning axis O5 may be parallel with an axis orthogonal to the fourth turning axis O4, and the sixth turning axis O6 may be parallel with an axis orthogonal to the fifth turning axis O5.

As illustrated in FIG. 6, the first arm 12 is provided with a first angular speed sensor (a first angular speed detector) 31, that is, a first angular speed sensor unit (a first member) 71 having the first angular speed sensor 31. The first angular speed sensor 31 detects the angular speed of the first arm 12, that is, an angular speed around an angular speed detecting axis 311 of the first angular speed sensor 31. The first member is a member with the first angular speed sensor (the first angular speed detector) 31, and a substrate (a first substrate) or the like is an example of the first member.

As illustrated in FIG. 7, the third arm 14 is provided with a second angular speed sensor (a second angular speed detector) 32, that is, a second angular speed sensor unit (a second member) 72 having the second angular speed sensor 32. The second angular speed sensor 32 detects the angular speed of the third arm 14, that is, an angular speed around an angular speed detecting axis 321 of the second angular speed sensor 32. The second member is a member with the second angular speed sensor (the second angular speed detector) 32, and a substrate (a second substrate) or the like is an example of the second member.

The type of each of the first angular speed sensor 31 and the second angular speed sensor 32 is not particularly limited, and a gyro sensor or the like can be used as the angular speed sensor.

Here, the robot 1 prevents an occurrence of vibration of the entirety of the robot 1 by preventing an occurrence of vibration of the first arm 12, the second arm 13, and the third arm 14. In order to prevent an occurrence of vibration of the first arm 12, the second arm 13, the third arm 14, an angular speed sensor is not installed in each of the first arm 12, the second arm 13, the third arm 14, but as described above, the first angular speed sensor 31 and the second angular speed sensor 32 are respectively installed only in the first arm 12 and the third arm 14, and the robot 1 controls the operation of each of the drive sources 401 and 402 based on detection results from the first angular speed sensor 31 and the second angular speed sensor 32. Accordingly, compared to when an angular speed sensor is provided in each of the first arm 12, the second arm 13, and the third arm 14, it is possible to reduce the number of angular speed sensors to be installed and to reduce costs, and the configuration can be simplified. Since the second angular speed sensor 32 does not detect the angular speed of the second arm 13, but detects the angular speed of the third arm 14, which includes an angular speed associated with a turning of the second arm 13, it is possible to more reliably prevent an occurrence of vibration. It is possible to more effectively prevent the vibration of the robot 1 by controlling the operation of the second drive source 402 for turning the second arm. 13 close to the proximal end side rather than the third arm 14.

The motors or the speed reducers of the drive sources 401 to 406 are respectively provided with a first position sensor 411, a second position sensor 412, a third position sensor 413, a fourth position sensor 414, a fifth position sensor 415, and a sixth position sensor 416. The type of the position sensor is not particularly limited, and an encoder, a rotary encoder, a resolver, potentiometer, or the like can be used as the position sensor. The position sensors 411 to 416 detect the rotational angles of the shaft portions of the motors or the speed reducers of the drive sources 401 to 406, respectively. The type of the motor of each of the drive sources 401 to 406 is not particularly limited, and a servo motor such as an AC servomotor or a DC servomotor is preferably used as the motor. Each of the above-mentioned cables may be inserted into the robot 1.

As illustrated in FIG. 4, the robot 1 is electrically connected to the robot control device 20. That is, the drive sources 401 to 406, the position sensors 411 to 416, and the angular speed sensors 31 and 32 are electrically connected to the robot control device 20.

The robot control device 20 can independently operate the arms 12 to 15 and the wrist 16, that is, independently control the drive sources 401 to 406 via the respective motor drivers 301 to 306. At this time, the robot control device 20 detects a state of an operation from the position sensors 411 to 416, and the first angular speed sensor 31 and the second angular speed sensor 32, and controls the driving of the drive sources 401 to 406, for example, an angular speed, a rotational angle, or the like. A control program is stored in a built-in recording medium of the robot control device 20 in advance.

As illustrated in FIGS. 1 and 2, when the robot 1 is a vertical articulated robot, the base 11 is a portion that is positioned on a lowermost side of the vertical articulated robot, and is fixed to the bed 101 in an installation space. A method of fixing the base 11 to the bed 10 is not particularly limited, and in the embodiment illustrated in FIGS. 1 and 2, for example, the bed 11 is fixed using a plurality of bolts 111. The base 11 can be fixed to a wall or a ceiling other than the bed in the installation space.

The base 11 has a hollow base main body (a housing) 112. The base main body 112 can be divided into a circular cylindrical portion 113 having a circular cylindrical shape, and a box-like portion 114 having a box shape which is formed integrally with an outer circumferential portion of the circular cylindrical portion 113. For example, the base main body 112 stores the motor 401M and the motor drivers 301 to 306.

Each of the arms 12 to 15 has a hollow arm main body (a housing) 2 and a drive mechanism 3. Hereinafter, for descriptive purposes, the arm main body 2, the drive mechanism 3, and a sealing section 4 (to be described later) of the first arm 12 may be referred to as an "arm main body 2a", a "drive mechanism 3a, and "sealing section 4a", respectively. The arm main body 2, the drive mechanism 3, and the sealing section 4 of the second arm 13 may be referred to as an "arm main body 2b", a "drive mechanism 3b, and "sealing section 4b", respectively. The arm main body 2, the drive mechanism. 3, and the sealing section 4 of the third arm 14 may be referred to as an "arm main body 2c", a "drive mechanism 3c, and "sealing section 4c", respectively. The arm main body 2, the drive mechanism 3, and the sealing section 4 of the fourth arm 15 may be referred to as an "arm main body 2d", a "drive mechanism 3d, and "sealing section 4d", respectively.

Each of the joints 171 to 176 has a turning support mechanism (not illustrated). The turning support mechanism acts as one of the following mechanisms: the turning support mechanism that supports two connected arms in such a manner that one of the two arms can turn with respect to the other; the turning support mechanism that supports the base 11 and the first arm 12 connected to each other in such a manner that one of the base 11 and the first arm 12 can turn with respect to the other; and the turning support mechanism that supports the fourth arm 15 and the wrist arm 16 connected to each other in such a manner that one of the fourth arm 15 and the wrist 16 can turn with respect to the other. Taking the fourth arm 15 and the wrist 16 for instance, the turning support mechanism can turn the wrist 16 with respect to the fourth arm 15. Each of the turning support mechanisms has a speed reducer (not illustrated) that reduces the rotational speed of the corresponding motor at a predetermined speed reduction ratio, and transmits a drive force to the corresponding arm, a wrist main body 161 and a support ring 162 of the wrist 16. As described above, in the embodiment, a drive source includes such a speed reducer and a motor.

The first arm 12 is connected to an upper end portion (a distal end portion) of the base 11 while being inclined with respect to the horizontal direction. In the first arm 12, the drive mechanism 3a has the motor 402M, and is accommodated in the arm main body 2a. The arm main body 2a is air-tightly sealed with the sealing section (a cover) 4a. The arm main body 2a has a pair of tongue-like portions (second portions) 241a and 241b on a distal end side thereof, and a root portion (a first portion) 251 on a proximal end side thereof. A positional relationship between the root portion (the first portion) 251, and the tongue-like portions 241a and 241b is fixed. The tongue-like portion 241a and the tongue-like portion 241b face each other while being separated from each other. The tongue-like portions 241a and 241b are inclined with respect to the root portion 251, and accordingly, the first arm 12 is inclined with respect to the horizontal direction. A proximal end portion of the second arm 13 is disposed between the tongue-like portion 241a and the tongue-like portion 241b. The sealing section 4a is a configuration element of each of the tongue-like portions 241a and 241b, and each of the tongue-like portions 241a and 241b is air-tightly sealed with the sealing section 4a. The arm main body 2a can be broadly divided into the first portion positioned closer to the base 11 than the second arm 13, and the second portion closer to the second arm 13 than the base 11.

The root portion 251 is in contact with the base 11. Specifically, the root portion 251 is turnably connected to the upper end portion (the distal end portion) of the base 11. The tongue-like portions 241a and 241b are in contact with the proximal end portion of the second arm 13. Specifically, the proximal end portion of the second arm. 13 is turnably connected to the tongue-like portions 241a and 241b. That is, the tongue-like portions 241a and 241b are turnably connected to the proximal end portion of the second arm 13.

As illustrated in FIG. 6, when seen from the direction of the second turning axis O2, the root portion 251 and the second arm 13 do not overlap with each other, and in contrast, a part of the tongue-like portion 241a and a part of the tongue-like portions 241b overlap the second arm 13.

As illustrated in FIG. 6, the first angular speed sensor unit 71 is installed inside the first arm 12. In the embodiment, the first angular speed sensor unit 71 is installed inside the tongue-like portion 241a of the first arm 12. Accordingly, it is possible to detect the angular speed of a portion of the first arm 12, the portion being subjected to large vibration, and thereby it is possible to more reliably prevent an occurrence of vibration.

When seen from the direction of the second turning axis O2, at least a part of the first angular speed sensor unit 71 is installed in a region in which the first arm 12 and the second arm 13 overlap with each other. In the embodiment, when seen from the direction of the second turning axis O2, the entirety of the first angular speed sensor unit 71 is installed in a region in which the first arm 12 and the second arm 13 overlap with each other, and the entirety of the first angular speed sensor unit 71 does not overlap the root portion 251. Accordingly, it is possible to detect the angular speed of a portion of the first arm 12, the portion being subjected to large vibration, and thereby it is possible to more reliably prevent an occurrence of vibration.

At this time, as in the configuration illustrated in the drawings, the first angular speed sensor unit 71 is preferably disposed in the second portion (the portion being positioned closer to the second arm 13 than the base 11) of the first arm 12, in other words, a distal end portion of the first arm 12, that is, a distal end portion of the tongue-like portion 241a. Since the vibration of the first arm 12 becomes the maximum in the distal end portion of the first arm 12, it is possible to detect the angular speed of a portion of the first arm 12, the portion being subjected to large vibration, and thereby it is possible to more reliably prevent an occurrence of vibration.

The tongue-like portion 241b of the first arm 12 accommodates a cable 85 for supplying electrical power to the motors 401M to 406M of the robot 1, and as described above, the first angular speed sensor unit 71 is installed inside the tongue-like portion 241a opposite to the tongue-like portion 241b. Accordingly, it is possible to prevent the first angular speed sensor 31 from receiving the impact of noise emitted from the cable 85, and it is possible to prevent a circuit portion 713 (to be described later), the wiring, and the first angular speed sensor 31 of the first angular speed sensor unit 71 from being shorted by the cable 85.

Here, with regard to the descriptions of the drive mechanism 3 and the speed reducer, the drive mechanism 3 for turning the second arm 13 and the speed reducer inside the arm main body 2a of the first arm 12 will be representatively described.

As illustrated in FIGS. 5 and 6, the drive mechanism 3 has a first pulley 91 connected to the shaft portion of the motor 402M; a second pulley 92 that is disposed while being separated from the first pulley 91; and a belt (a timing belt) 93 wrapped around the first pulley 91 and the second pulley 92. The second pulley 92 and a shaft portion of the second arm 13 are connected to each other via a speed reducer 45.

The following is the main causes of vibration of the arms 12 to 15, and the wrist 16 of the robot 1: the torsion or the bending of the speed reducer 45; the expansion and contraction of the belt 93; the bending of the arms 12 to 15, and the wrist 16; and the like.

The type of the speed reducer 45 is not particularly limited, and a speed reducer formed of a plurality of gears, a speed reducer referred to as the Harmonic Drive (the "Harmonic Drive" is a trademark), or the like is an example of the speed reducer 45.

Subsequently, the speed reducer 45 will be described. Hereinafter, the configuration of the speed reducer is described as only one example.

As illustrated in FIG. 9, a root portion 252 of the second arm 13 is disposed between the tongue-like portion 241a and the tongue-like portion 241b of the first arm 12.

The tongue-like portion 241b is rotatably supported by the root portion 252 via a bearing 183. A rotating shaft 921 is fixed to a center portion of the pulley 92. The tongue-like portion 241a and the root portion 252 rotatably support the rotating shaft 921 via a bearing 181 and a bearing 182, respectively.

The speed reducer 45 is a speed reducer of a unit type, and includes a speed reducing portion 451 and a bearing 456. The speed reducing portion 451 serves to reduce the rotation of the pulley 92 and to transmit the output to the root portion 252 of the second arm 13, and the bearing 456 serves to support the tongue-like portion 241a of the first arm 12 and the root portion 252 in such a manner that one of the tongue-like portion 241a and the root portion 252 can turn with respect to the other.

The bearing 456 is formed of a cross roller bearing, and has an outer ring 457; an inner ring 458; and a plurality of rollers 459.

The root portion 252 rotatably supports the tongue-like portion 241a via the bearing 456. That is, the inner ring 458 of the bearing 456 is fixed to the tongue-like portion 241a, and the outer ring 457 is fixed to the root portion 252.

The speed reducing portion 451 is formed of a speed reducer referred to as the Harmonic Drive (the "Harmonic Drive" is a trademark), a strain wave gear device, or the like, and has a gear 452 disposed on an outer circumferential side, and a gear 455 disposed on an inner circumferential side.

The gear 452 has a circular inner shape, and has a cylindrical portion 453 that has a plurality of teeth on the inner circumference thereof, and an attachment portion 454.

The gear 455 has an elliptical outer shape, and has a plurality of teeth on the outer circumference thereof, and the number of teeth of the gear 455 is less than that of the gear 452. The gear 455 is disposed on an inner circumferential side of the gear 452, and the teeth of the gear 452 meshes with those of the gear 455. The gear 455 is fixed to the rotating shaft 921 that is fixed to the center portion of the pulley 92.

The attachment portion 454 of the gear 452 is attached to the outer ring 457 of the bearing 456.

As such, the speed reducer 45 is provided across the tongue-like portion 241a and the root portion 252.

The speed reducer 45 illustrated in FIG. 9 is a speed reducer of a unit type; however, the type of the speed reducer 45 is not limited. For example, the speed reducer 45 may be a speed reducer of a component type which is formed of the following two separate devices: a device that serves to reduce the rotation of the pulley 92, and to transmit the output to the root portion 252 of the second arm 13; and a device that serves to support the tongue-like portion 241a of the first arm 12 and the root portion 252 in such a manner that one of the tongue-like portion 241a and the root portion 252 can turn with respect to the other.

As illustrated in FIGS. 1 to 3, the second arm 13 is connected to the distal end portion of the first arm 12. In the second arm 13, the drive mechanism 3b has the motor 403M, and is accommodated in the arm main body 2b. The arm main body 2b is air-tightly sealed with the sealing section 4b. The arm main body 2b has a pair of tongue-like portions 242a and 242b on a distal end side thereof, and a root portion 252 on a proximal end side thereof. The tongue-like portion 242a and the tongue-like portion 242b face each other while being separated from each other. A proximal end portion of the third arm 14 is disposed between the tongue-like portion 242a and the tongue-like portion 242b. The sealing section 4b is a configuration element of each of the tongue-like portions 242a and 242b, and each of the tongue-like portions 242a and 242b is air-tightly sealed with the sealing section 4b.

The third arm 14 is connected to the distal end portion of the second arm 13. In the third arm 14, the drive mechanism 3c has the motor 404M, and is accommodated in the arm main body 2c. The arm main body 2c is air-tightly sealed with the sealing section 4c. The arm main body 2c is formed of a member equivalent to the root portion 251 of the arm main body 2a, and a member equivalent to the root portion 252 of the arm main body 2b.

The installation position of the second angular speed sensor 32 in the third arm 14 is not particularly limited; however, as illustrated in FIG. 7, the second angular speed sensor 32, that is, the second angular speed sensor unit 72 is installed in an end portion inside the arm main body 2c of the third arm 14, the end portion being opposite to the cable 85. Accordingly, it is possible to prevent the second angular speed sensor 32 from receiving the impact of noise emitted from the cable 85, and it is possible to prevent a circuit portion 723, the wiring, and the second angular speed sensor 32 of the second angular speed sensor unit 72 from being shorted by the cable 85.

The fourth arm 15 is connected to a distal end portion of the third arm 14 while being in parallel with the direction of the center axis of the third arm 14. In the arm 15, the drive mechanism 3d has the motors 405M and 406M, and is accommodated in the arm main body 2d. The arm main body 2d is air-tightly sealed with the sealing section 4d. The arm main body 2d has a pair of tongue-like portions (second portions) 244a and 244b on a distal end side thereof, and a root portion 254 on a proximal end side thereof. The tongue-like portion 244a and the tongue-like portion 244b face each other while being separated from each other. The support ring 162 of the wrist 16 is disposed between the tongue-like portion 244a and the tongue-like portion 244b. The sealing section 4d is a configuration element of each of the tongue-like portions 244a and 244b, and each of the tongue-like portions 244a and 244b is air-tightly sealed with the sealing section 4d.

The wrist 16 is connected to the distal end portion (the end portion being opposite to the base 11) of the fourth arm 15. A manipulator (not illustrated) as a functional portion (an end effector) for holding precision equipment such as a wrist watch is detachably and attachably mounted on a distal end portion (an end portion being opposite to the fourth arm 15) of the wrist 16. The configuration of the manipulator is not limited, and for example, the manipulator may have a plurality of finger portions (fingers). The robot 1 can transport precision equipment by controlling the operation of each of the arms 12 to 15, the wrist 16, and the like while holding the precision equipment with the manipulator.

The wrist 16 has the wrist main body (the sixth arm) 161 having a circular cylindrical shape, and the support ring (the fifth arm) 162 having a ring shape which is formed separately from the wrist main body 161, and is provided in a proximal end portion of the wrist main body 161.

A proximal end surface 163 of the wrist main body 161 is a flat surface, and is a mounting surface on which the manipulator is mounted. The wrist main body 161 is connected to the drive mechanism 3d of the fourth arm 15 via the joint 176, and turns around the turning axis O6 via the driving of the motor 406M of the drive mechanism 3d.

The support ring 162 is connected to the drive mechanism 3d of the fourth arm 15 via the joint 175, and turns around the turning axis O5 along with the wrist main body 161 via the driving of the motor 405M of the drive mechanism 3d.

The material of the arm main body 2 is not particularly limited. For example, various metal materials can be used, and particularly, aluminum or an aluminum alloy among these materials is preferably used as the material of the arm main body. When the arm main body 2 is a casting that is formed using a metal mold, it is possible to easily form the metal arm main body 2 by using aluminum or an aluminum alloy as the material of the arm main body 2.

The material of each of the base main body 112 of the base 11, and the wrist main body 161 and the support ring 162 of the wrist 16 is not particularly limited, and for example, the same material as the arm main body 2 may be used. Stainless steel is preferably used as the material of the wrist main body 161 of the wrist 16.

The material of the sealing section 4 is not particularly limited, and for example, various resin materials or various metal materials can be used as the material of the sealing section 4. It is possible to reduce the weight of the sealing section 4 by using a resin material as the material of the sealing section 4.

Subsequently, the first angular speed sensor unit and the second angular speed sensor unit 72 will be described.

As illustrated in FIG. 8, the first angular speed sensor unit 71 has a first housing 711; a circuit substrate 712 that is provided in the first housing 711, and has wirings; and the first angular speed sensor 31 and a circuit portion 713 that are electrically connected on the circuit substrate 712. In the embodiment, the first housing 711 is formed of a sealing member, and the entirety of the first angular speed sensor 31, the circuit portion 713, and the circuit substrate 712 is sealed with the sealing member.

Similarly, the second angular speed sensor unit 72 has a second housing 721; a circuit substrate 722 that is provided in the second housing 721, and has wirings; and the second angular speed sensor 32 and a circuit portion 723 that are electrically connected on the circuit substrate 722. In the embodiment, the second housing 721 is formed of a sealing member, and the entirety of the second angular speed sensor 32, the circuit portion 723, and the circuit substrate 722 is sealed with the sealing member.

As such, since the first angular speed sensor 31 and the circuit portion 713 are packaged into a unit, and the second angular speed sensor 32 and the circuit portion 723 are packaged into a unit, the configuration can be simplified.

Since the configuration and the function of the first angular speed sensor unit 71 are the same as those of the second angular speed sensor unit 72, hereinafter, the first angular speed sensor unit 71 will be representatively described.

First, the circuit portion 713 has an AD conversion portion that AD converts signals from the first angular speed sensor 31, that is, converts analog signals into digital signals, and a transmitting portion that transmits the converted signals to the robot control device 20.

The outer shape of the first housing 711 has a cube.

As illustrated in FIG. 6, the first angular speed sensor 31 has the angular speed detecting axis (hereinafter, simply referred to as a "detecting axis 311 (refer to FIG. 6), and is configured to detect the angular speed around the detecting axis 311. The detecting axis 311 of the first angular speed sensor 31 coincides with the normal line of the largest surface of the first housing 711 having a rectangular parallelepiped shape. Accordingly, it is possible to easily and reliably recognize the direction of the detecting axis 311 of the first angular speed sensor 31 and the direction of the detecting axis 321 of the second angular speed sensor 32, and it is possible to easily bring the first angular speed sensor 31 and the second angular speed sensor 32 into a proper posture. The first angular speed sensor 31, that is, the first angular speed sensor unit 71 is installed in such a manner the detecting axis 311 of the first angular speed sensor 31 is parallel with the first turning axis O1. As illustrated in FIG. 7, the second angular speed sensor 32, that is, the second angular speed sensor unit 72 is installed in such a manner the detecting axis 321 of the second angular speed sensor 32 is parallel with the third turning axis O3.

As illustrated in FIGS. 6 and 8, attachment portions 7111 are provided at four corners of the first housing 711, and are attached to the first arm 12. Each of the attachment portions 7111 is provided with a hole 7112, into which a male screw (a fixing member) 81 is inserted.

When the first angular speed sensor unit 71 is attached (installed) to the first arm 12, four male screws 81 are respectively inserted into the holes 7112 of the first housing 711, and are respectively screwed into four female screws of an arm attachment portion 121 of the first arm 12. Accordingly, the attachment portions 7111 of the first housing 711 are fixed to the arm attachment portion 121 via the male screws 81. That is, the first angular speed sensor unit 71 is attached to the arm attachment portion 121.

As illustrated in FIGS. 7 and 8, attachment portions 7211 are provided at four corners of the second housing 721, and are attached to the third arm 14. Each of the attachment portions 7211 is provided with a hole 7212, into which the male screw (the fixing member) 81 is inserted.

As illustrated in FIG. 7, the third arm 14 has an arm attachment portion 141 which is formed integrally with the arm main body 2c, and to which the second angular speed sensor unit 72 (the second housing 721) is attached. The arm attachment portion 141 has a shape corresponding to the shape of the second housing 721. That is, the arm attachment portion 141 is made to have a plate shape, the plan view shape is a quadrangle, and in the embodiment, the arm attachment portion 141 is made to have rectangular shape. Each corner of the arm attachment portion 141 is provided with a female screw into which the male screw 81 is screwed.

In the expression that the arm attachment portion 141 is formed integrally with the arm main body 2c, the term "being integrally formed" does not refer to the case in which the arm attachment portion 141 and the arm main body 2c are respectively formed of separate members, and are joined together, but refers to the case in which the arm main body 2c and the arm attachment portion 141 are simultaneously formed via die casting or the like.

When the second angular speed sensor unit 72 is attached to the third arm 14, four male screws 81 are respectively inserted into the holes 7212 of the second housing 721, and are respectively screwed into female screws in the distal end portions of the arm attachment portion 141 of the third arm 14. Accordingly, the attachment portions 7211 of the second housing 721 are fixed to the arm attachment portion 141 of the third arm 14 via the male screws 81. That is, the second angular speed sensor unit 72 is attached to the arm attachment portion 141 of the third arm 14. At this time, there is nothing interposed between the arm attachment portion 141 and the second angular speed sensor unit 72, that is, the second angular speed sensor unit 72 is directly attached to the arm attachment portion 141. Accordingly, it is possible to reliably attach the second angular speed sensor unit 72 to the third arm 14, and it is possible to reliably turn the second angular speed sensor unit 72 integrally with the third arm 14.

In the expression that the second angular speed sensor unit 72 is directly attached to the arm attachment portion 141, the term. "being directly attached" does not refer to the case in which the second angular speed sensor unit 72 is attached to an intermediate body such as a separate substrate, and the intermediate body is attached to the arm attachment portion 141. That is, the term "being directly attached" refers to the case in which there is nothing interposed between the arm attachment portion 141 and the second angular speed sensor unit 72 except for an adhesive or the like.

In addition, the male screw 81 has conductive properties, and for example, is made of various metal materials. When the male screw 81 is inserted into the hole 7212 of the second housing 721, and is screwed into the female screw of the arm attachment portion 141, the male screw 81 is electrically connected to a wiring of the circuit substrate 722 that is electrically connected to a ground terminal of the circuit portion 723, and a distal end portion of the male screw 81 is electrically connected to the arm attachment portion 141. Accordingly, the ground terminal of the circuit portion 723 is electrically connected to the arm main body 2c of the third arm 14 and is grounded via the wiring and the male screw 81. Accordingly, it is possible to eliminate components required for the grounding of the ground terminal, and the configuration of the second angular speed sensor unit 72 can be simplified.

Subsequently, the configuration of the robot control device 20 will be described with reference to FIG. 4 and FIGS. 10 to 14.

The robot control device 20 has a receiving unit that receives a first signal from the first angular speed sensor 31, a second signal from the second angular speed sensor 32, and a signal from each of the position sensors 411 to 416; a computing unit that respectively computes vibration components of the angular speed of the first arm 12 and the angular speed of the third arm 14 based on the first signal and the second signal received by the receiving unit; and a control unit that controls the operation of the robot 1 based on the vibration component of the angular speed of the first arm 12 and the vibration component of the angular speed of the third arm 14 which are computed by the computing unit.

Specifically, as illustrated in FIG. 4 and FIGS. 10 to 14, the robot control device 20 has the receiving unit; a first drive source control unit 201 for controlling the operation of the first drive source 401; a second drive source control unit 202 for controlling the operation of the second drive source 402; a third drive source control unit 203 for controlling the operation of the third drive source 403; a fourth drive source control unit 204 for controlling the operation of the fourth drive source 404; a fifth drive source control unit 205 for controlling the operation of the fifth drive source 405; and a sixth drive source control unit 206 for controlling the operation of the sixth drive source 406.

The computing unit is formed of an angular speed calculation unit 561 (to be described later) of the first drive source control unit 201; a subtractor 571; an angular speed calculation unit 562 (to be described later) of the second drive source control unit 202; an adder-subtractor 622; and an angular speed calculation unit 563 (to be described later) of the third drive source control unit 203.

Figure 10:
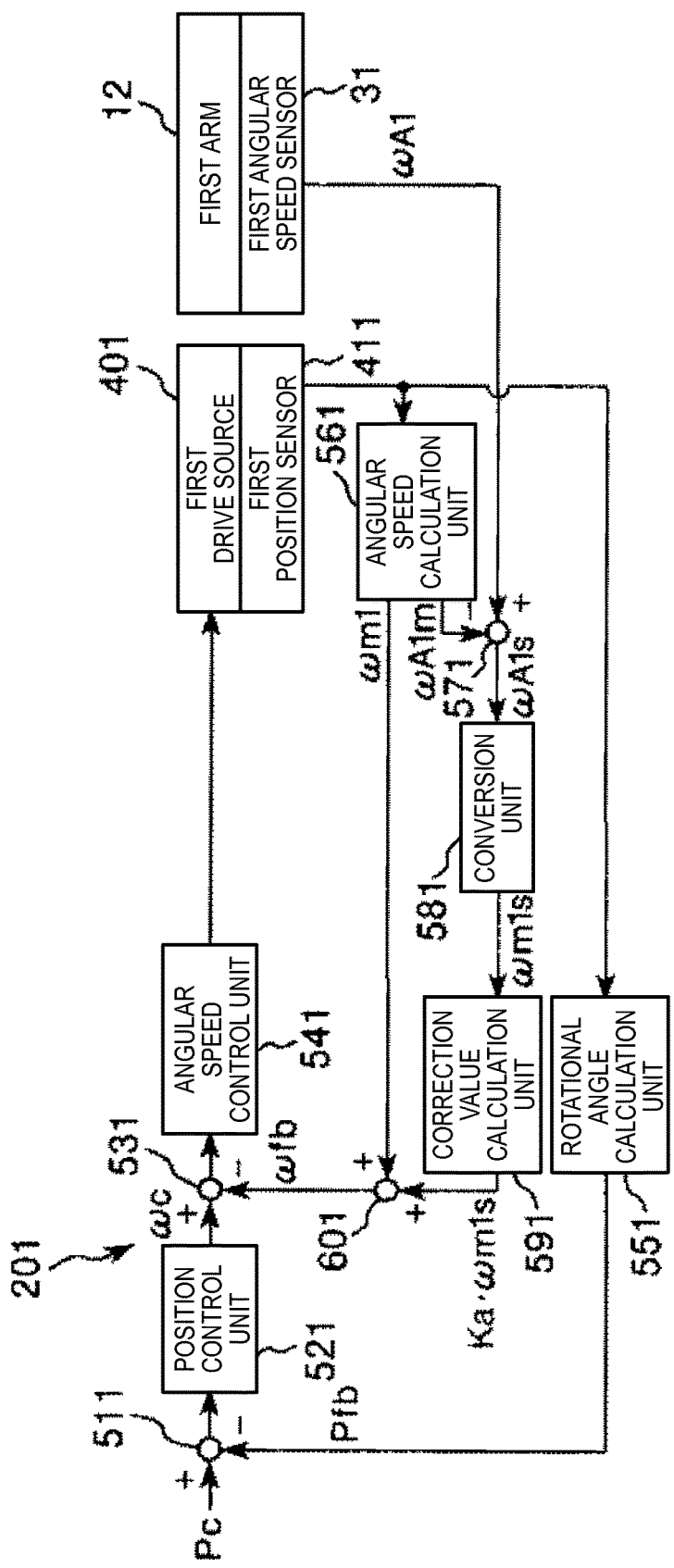
FIG. 10 is a block diagram illustrating the main portions of the robot illustrated in FIG. 1.

As illustrated in FIG. 10, the first drive source control unit 201 has a subtractor 511; a position control unit 521; a subtractor 531; an angular speed control unit 541; a rotational angle calculation unit 551; the angular speed calculation unit 561; the subtractor 571; a conversion unit 581; a correction value calculation unit 591; and an adder 601.

Figure 11:
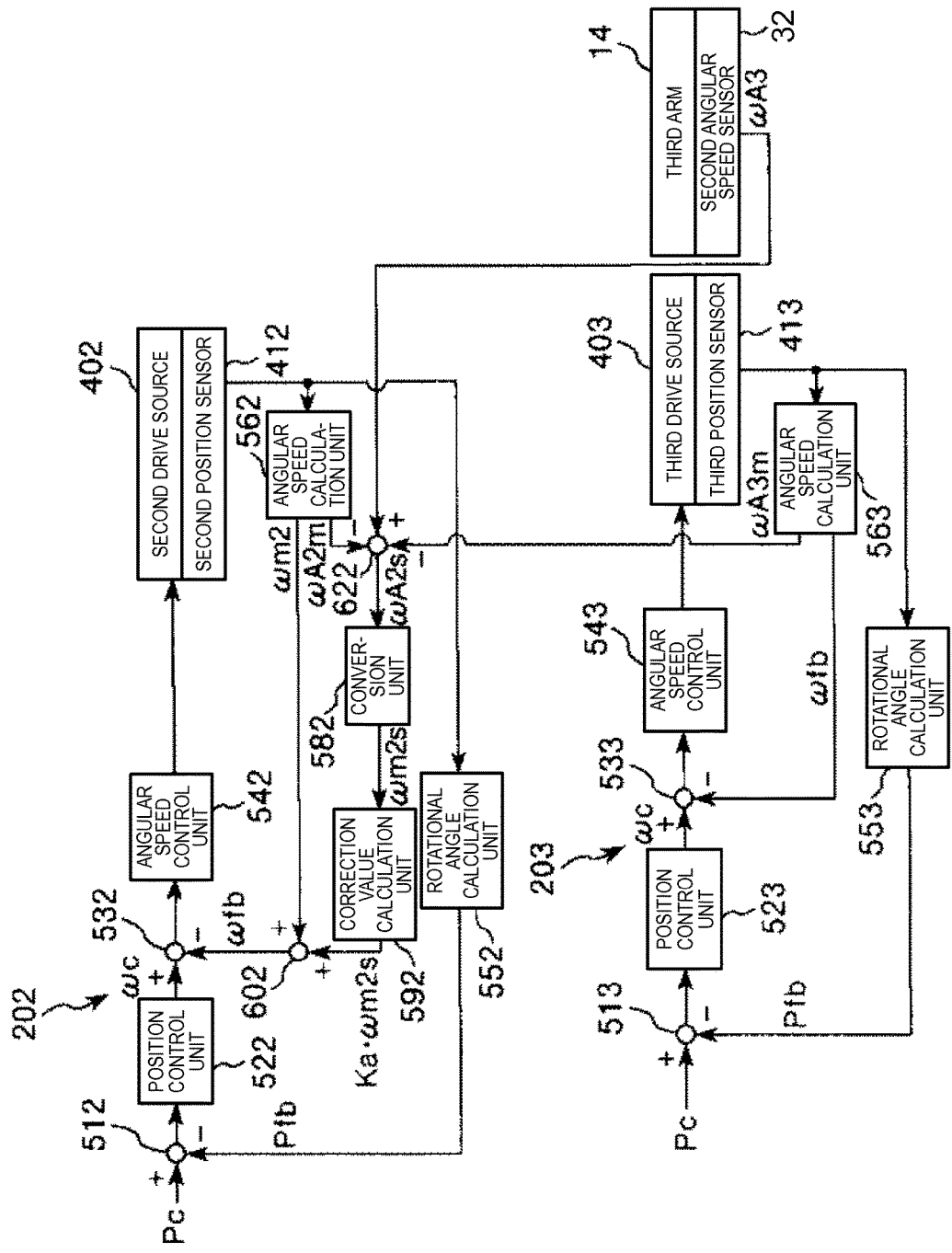
FIG. 11 is a block diagram illustrating the main portions of the robot illustrated in FIG. 1.

As illustrated in FIG. 11, the second drive source control unit 202 has a subtractor 512; a position control unit 522; a subtractor 532; an angular speed control unit 542; a rotational angle calculation unit 552; the angular speed calculation unit 562; the adder-subtractor 622; a conversion unit 582; a correction value calculation unit 592; and an adder 602.

As illustrated in FIG. 11, the third drive source control unit 203 has a subtractor 513; a position control unit 523; a subtractor 533; an angular speed control unit 543; a rotational angle calculation unit 553; and the angular speed calculation unit 563.

Figure 12:
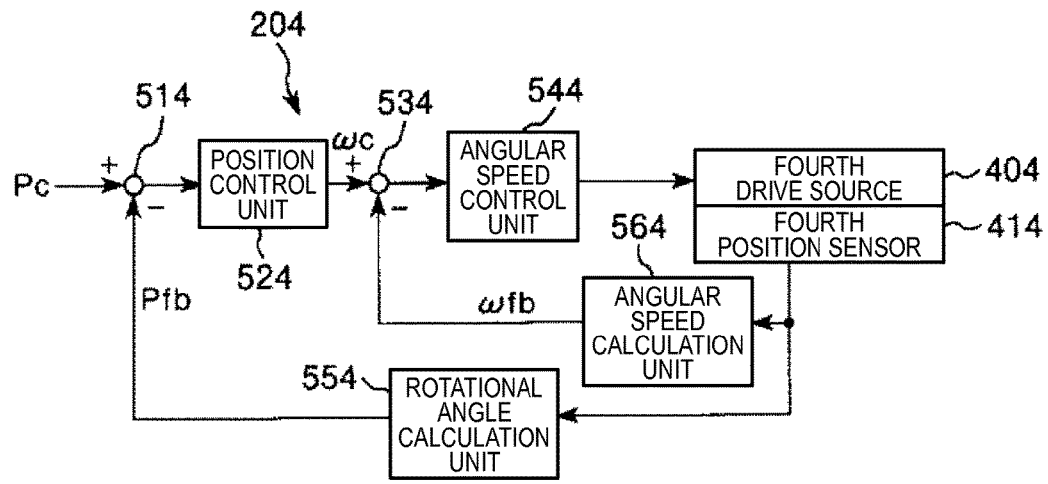
FIG. 12 is a block diagram illustrating the main portions of the robot illustrated in FIG. 1.

As illustrated in FIG. 12, the fourth drive source control unit 204 has a subtractor 514; a position control unit 524; a subtractor 534; an angular speed control unit 544; a rotational angle calculation unit 554; and the angular speed calculation unit 564.

Figure 13:
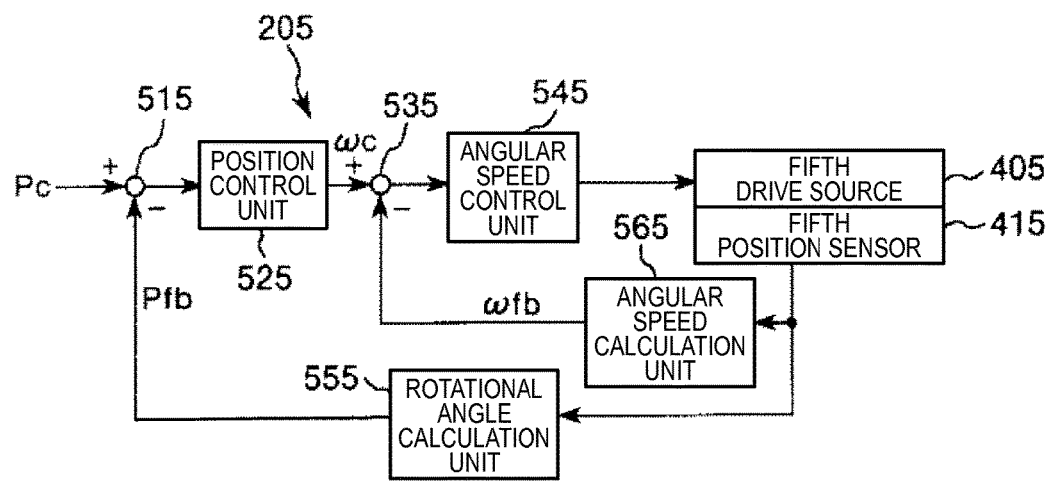
FIG. 13 is a block diagram illustrating the main portions of the robot illustrated in FIG. 1.

As illustrated in FIG. 13, the fifth drive source control unit 205 has a subtractor 515; a position control unit 525; a subtractor 535; an angular speed control unit 545; a rotational angle calculation unit 555; and an angular speed calculation unit 565.

Figure 14:
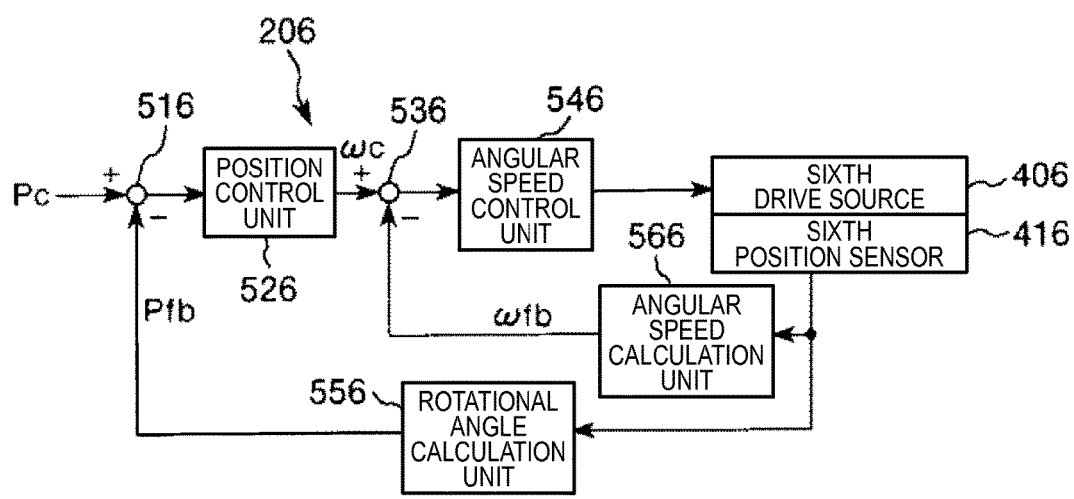
FIG. 14 is a block diagram illustrating the main portions of the robot illustrated in FIG. 1.

As illustrated in FIG. 14, the sixth drive source control unit 206 has a subtractor 516; a position control unit 526; a subtractor 536; an angular speed control unit 546; a rotational angle calculation unit 556; and an angular speed calculation unit 566.

Here, the robot control device 20 computes a target position of the wrist 16 based on the content of processes of the robot 1, and generates a trajectory for moving the wrist 16 to the target position. The robot control device 20 measures the rotational angle of each of the drive sources 401 to 406 at predetermined control intervals in order for the wrist 16 to move along the generated trajectory, and outputs the values (the values being computed based on the measurement results) to the drive source control units 201 to 206 as position commands Pc for of the drive sources 401 to 406, respectively (refer to FIGS. 10 to 14). In the description above and the following description, the expression that "a value is input or output" is stated; however, the expression refers to the case in which "a signal corresponding to a value is input or output".

As illustrated in FIG. 10, the first drive source control unit 201 receives a detection signal from each of the first position sensor 411 and the first angular speed sensor 31, in addition to the position command Pc for the first drive source 401. The first drive source control unit 201 drives the first drive source 401 via feedback control based on the detection signals in such a manner that the rotational angle (a position feedback value Pfb) (the rotational angle being calculated based on the detection signal from the first position sensor 411) of the first drive source 401 becomes equal to the position command Pc, and an angular speed feedback value ωfb (to be described later) becomes equal to an angular speed command ωc (to be described later).

That is, the position command Pc is input to the subtractor 511 of the first drive source control unit 201, and the position feedback value Pfb (to be described later) is also input thereinto from the rotational angle calculation unit 551. The rotational angle calculation unit 551 counts the number of pulses from the first position sensor 411, and the rotational angle of the first drive source 401, which corresponds to the value of the count, is output from the rotational angle calculation unit 551 to the subtractor 511 as the position feedback value Pfb. The subtractor 511 outputs a deviation (a value being obtained by subtracting the position feedback value Pfb from a target value of the rotational angle of the first drive source 401) between the position command Pc and the position feedback value Pfb to the position control unit 521.

The position control unit 521 computes the target value of the angular speed of the first drive source 401, which corresponds to the deviation, by performing predetermined computational processes using the deviation from the subtractor 511, a proportional gain (the gain being a predetermined coefficient), and the like. The position control unit 521 outputs a signal (the signal indicative of the target value (the command value) of the angular speed of the first drive source 401) to the subtractor 531 as the angular speed command ωc. Here, in the embodiment, a proportional control (P control) is used for the feedback control; however, the feedback control is not limited to the proportional control.

The angular speed command ωc and the angular speed feedback value ωfb (to be described later) are input to the subtractor 531. The subtractor 531 outputs a deviation (a value being obtained by subtracting the angular speed feedback value ωfb from a target value of the angular speed of the first drive source 401) between the angular speed command ωc and the angular speed feedback value ωfb to the angular speed control unit 541.

The angular speed control unit 541 generates a drive signal (drive current) for the first drive source 401, which corresponds to the deviation, by performing predetermined computational processes (including integral calculus) using the deviation from the subtractor 531, a proportional gain (the gain being a predetermined coefficient), an integral gain, and the like, and supplies the output to the motor 401M via the motor driver 301. Here, in the embodiment, PI control is used for the feedback control; however, the feedback control is not limited to the PI control.

The feedback control is performed and the drive current of the first drive source 401 is controlled in such a manner that the position feedback value Pfb becomes as equal to the position command Pc as possible, and the angular speed feedback value ωfb becomes as equal to the angular speed command ωc as possible.

Subsequently, the angular speed feedback valve ωfb in the first drive source control unit 201 will be described.

The angular speed calculation unit 561 calculates an angular speed ωm1 of the first drive source 401 based on the frequency of pulse signals from the first position sensor 411, and outputs the angular speed ωm1 to the adder 601.

The angular speed calculation unit 561 calculates an angular speed ωA1m of the first arm 12 around the first turning axis O1 based on the frequency of the pulse signals from the first position sensor 411, and outputs the angular speed ωA1m to the subtractor 571. The angular speed ωA1m is a value that is obtained by dividing the angular speed ωm1 by a speed reduction ratio between the motor 401M of the first drive source 401 and the first arm 12, that is, a speed reduction ration at the joint 171.

The first angular speed sensor 31 detects the angular speed of the first arm 12 around the first turning axis O1. The subtractor 571 receives a detection signal from the first angular speed sensor 31, that is, an angular speed ωA1 of the first arm 12 around the first turning axis O1, the angular speed ωA1 being detected by the first angular speed sensor 31.

The angular speed ωA1 and the angular speed ωA1m are input to the subtractor 571, and the subtractor 571 outputs a value ωA1s (a value being obtained by subtracting the angular speed ωA1m from the angular speed ωA1) (=ωA1−ωA1m) to the conversion unit 581. The value ωA1s is equivalent to a vibration component of the angular speed (the vibration of an angular speed) of the first arm 12 around the first turning axis O1. Hereinafter, ωA1s is referred to as the vibration of an angular speed. In the embodiment, feedback control is performed in such a manner that the vibration of an angular speed ωA1s (specifically, an angular speed ωm1s of the motor 401M, which is a value generated based on the vibration of an angular speed ωA1s is input to an input side of the drive source 401 while being multiplied by a gain Ka (to be described later). Specifically, the feedback control of the drive source 401 is performed in such a manner that the vibration of an angular speed ωA1s becomes as close to zero as possible. Accordingly, it is possible to prevent an occurrence of the robot 1. The angular speed of the drive source 401 is controlled via this feedback control.

The conversion unit 581 converts the vibration of an angular speed ωA1s into the angular speed ωm1s of the first drive source 401, and outputs the angular speed ωm1s to the correction valve calculation unit 591. This conversion can be done by multiplying the vibration of an angular speed ωA1s by the speed reduction ratio between the motor 401M of the first drive source 401 and the first arm 12, that is, the speed reduction ration at the joint 171.

The correction valve calculation unit 591 obtains a correction value Ka·ωm1s by multiplying the angular speed ωm1s by the gain (feedback gain) Ka (the gain being a predetermined coefficient), and the correction valve calculation unit 591 outputs the correction value Ka·ωm1s to the adder 601.

The angular speed ωm1 and the correction value Ka·ωm1s are input to the adder 601. The adder 601 outputs the value of the sum of the angular speed ωm1 and the correction value Ka·ωm1s to the subtractor 531 as the angular speed feedback value ωfb. A subsequent operation is the same as described above.

As illustrated in FIG. 11, the second drive source control unit 202 receives a detection signal from each of the second position sensor 412 and the second angular speed sensor 32, in addition to the position command Pc for the second drive source 402. In addition, an angular speed ωA3m of the arm 15 around the third turning axis O3 is input to the second drive source control unit 202 from the third drive source control unit 203. The second drive source control unit 202 drives the second drive source 402 via feedback control based on the detection signals in such a manner that the rotational angle (the position feedback value Pfb) (the rotational angle being calculated based on the detection signal from the second position sensor 412) of the second drive source 402 becomes equal to the position command Pc, and the angular speed feedback value ωfb (to be described later) becomes equal to the angular speed command ωc (to be described later).

That is, the position command Pc is input to the subtractor 512 of the second drive source control unit 202, and the position feedback value Pfb (to be described later) is also input thereinto from the rotational angle calculation unit 552. The rotational angle calculation unit 552 counts the number of pulses from the second position sensor 412, and the rotational angle of the second drive source 402, which corresponds to the value of the count, is output from the rotational angle calculation unit 552 to the subtractor 512 as the position feedback value Pfb. The subtractor 512 outputs a deviation (a value being obtained by subtracting the position feedback value Pfb from a target value of the rotational angle of the second drive source 402) between the position command Pc and the position feedback value Pfb to the position control unit 522.

The position control unit 522 computes the target value of the angular speed of the second drive source 402, which corresponds to the deviation, by performing predetermined computational processes using the deviation from the subtractor 512, a proportional gain (the gain being a predetermined coefficient), and the like. The position control unit 522 outputs a signal (the signal indicative of the target value (the command value) of the angular speed of the second drive source 402) to the subtractor 532 as the angular speed command ωc. Here, in the embodiment, a proportional control (P control) is used for the feedback control; however, the feedback control is not limited to the proportional control.

The angular speed command ωc and the angular speed feedback value ωfb (to be described later) are input to the subtractor 532. The subtractor 532 outputs a deviation (a value being obtained by subtracting the angular speed feedback value ωfb from a target value of the angular speed of the second drive source 402) between the angular speed command ωc and the angular speed feedback value ωfb to the angular speed control unit 542.

The angular speed control unit 542 generates a drive signal (drive current) for the second drive source 402, which corresponds to the deviation, by performing predetermined computational processes (including integral calculus) using the deviation from the subtractor 532, a proportional gain (the gain being a predetermined coefficient), an integral gain, and the like, and supplies the output to the motor 402M via the motor driver 302. Here, in the embodiment, PI control is used for the feedback control; however, the feedback control is not limited to the PI control.

The feedback control is performed and the drive current of the second drive source 402 is controlled in such a manner that the position feedback value Pfb becomes as equal to the position command Pc as possible, and the angular speed feedback value ωfb becomes as equal to the angular speed command) c as possible. Since the second turning axis O2 is orthogonal to the first turning axis O1, independently from the first drive source 401, it is possible to control the operation of the second drive source 402 without receiving the operation or the vibration of the first arm 12.

Subsequently, the angular speed feedback valve ωfb in the second drive source control unit 202 will be described.

The angular speed calculation unit 562 calculates an angular speed ωm2 of the second drive source 402 based on the frequency of pulse signals from the second position sensor 412, and outputs the angular speed ωm2 to the adder 602.

The angular speed calculation unit 562 calculates an angular speed ωA2m of the second arm 13 around the second turning axis O2 based on the frequency of the pulse signals from the second position sensor 412, and outputs the angular speed ωA2m to the adder-subtractor 622. The angular speed ωA2m is a value that is obtained by dividing the angular speed ωm2 by a speed reduction ratio between the motor 402M of the second drive source 402 and the second arm 13, that is, a speed reduction ratio at the joint 172.

The angular speed calculation unit 563 of the third drive source control unit 203 calculates an angular speed ωA3m of the third arm 14 around the third turning axis O3 based on the frequency of pulse signals from the third position sensor 413, and outputs the angular speed ωA3m to the adder-subtractor 622. The angular speed ωA3m is a value that is obtained by dividing the angular speed ωm3 by a speed reduction ratio between the motor 403M of the third drive source 403 and the third arm 14, that is, a speed reduction ratio at the joint 173.

The second angular speed sensor 32 detects the angular speed of the third arm 14 around the second turning axis O2. The adder-subtractor 622 receives a detection signal from the second angular speed sensor 32, that is, an angular speed ωA3 of the third arm 14 around the second turning axis O2, the angular speed ωA3 being detected by the second angular speed sensor 32. Since the second turning axis O2 and the third turning axis O3 are orthogonal to the first turning axis O1, it is possible to easily and reliably obtain the angular speed of the third arm 14 around the second turning axis O2 without receiving the operation or the vibration of the first arm 12.

The angular speed ωA3, the angular speed ωA2m, and the angular speed ωA3m are input to the adder-subtractor 622, and the adder-subtractor 622 outputs a value ωA2s (a value being obtained by subtracting the angular speed ωA2m and the angular speed ωA3m from the angular speed ωA3) (=ωA3−ωA2m−ωA3m) to the conversion unit 582. The value ωA2s is equivalent to a vibration component of the sum of the respective angular speeds (the vibration of an angular speed) of the second arm 13 and the third arm 14 around the second turning axis O2. Hereinafter, ωA2s is referred to as the vibration of an angular speed. In the embodiment, feedback control is performed in such a manner that the vibration of an angular speed ωA2s (specifically, an angular speed ωm2s of the motor 402M, which is a value generated based on the vibration of an angular speed ωA2s) is input to an input side of the second drive source 402 while being multiplied by the gain Ka (to be described later). Specifically, the feedback control of the second drive source 402 is performed in such a manner that the vibration of an angular speed ωA2s becomes as close to zero as possible. Accordingly, it is possible to prevent an occurrence of the vibration of the robot 1. The angular speed of the second drive source 402 is controlled via this feedback control.

The conversion unit 582 converts the vibration of an angular speed ωA2s into the angular speed ωm2s of the second drive source 402, and outputs the angular speed ωm2s to the correction valve calculation unit 592. This conversion can be done by multiplying the vibration of an angular speed ωA2s by the speed reduction ratio between the motor 402M of the second drive source 402 and the second arm 13, that is, the speed reduction ratio at the joint 172.

The correction valve calculation unit 592 obtains a correction value Ka·ωm2s by multiplying the angular speed ωm2s by the gain (feedback gain) Ka (the gain being a predetermined coefficient), and the correction valve calculation unit 592 outputs the correction value Ka·ωm2s to the adder 602. The gain Ka of the second drive source control unit 202 may be the same as or different from the gain Ka of the first drive source control unit 201.

The angular speed ωm2 and the correction value Ka·ωm2s are input to the adder 602. The adder 602 outputs the value of the sum of the angular speed ωm2 and the correction value Ka·ωm2s to the subtractor 532 as the angular speed feedback value ωfb. A subsequent operation is the same as described above.

As illustrated in FIG. 11, the third drive source control unit 203 receives a detection signal from the third position sensor 413, in addition to the position command Pc for the third drive source 403. The third drive source control unit 203 drives the third drive source 403 via feedback control based on the detection signal in such a manner that the rotational angle (the position feedback value Pfb) (the rotational angle being calculated based on the detection signal from the third position sensor 413) of the third drive source 403 becomes equal to the position command Pc, and the angular speed feedback value ωfb (to be described later) becomes equal to the angular speed command ωc.

That is, the position command Pc is input to the subtractor 513 of the third drive source control unit 203, and the position feedback value Pfb (to be described later) is also input thereinto from the rotational angle calculation unit 553. The rotational angle calculation unit 553 counts the number of pulses from the third position sensor 413, and the rotational angle of the third drive source 403, which corresponds to the value of the count, is output from the rotational angle calculation unit 553 to the subtractor 513 as the position feedback value Pfb. The subtractor 513 outputs a deviation (a value being obtained by subtracting the position feedback value Pfb from a target value of the rotational angle of the third drive source 403) between the position command Pc and the position feedback value Pfb to the position control unit 523.

The position control unit 523 computes the target value of the angular speed of the third drive source 403, which corresponds to the deviation, by performing predetermined computational processes using the deviation input from the subtractor 513, a proportional gain (the gain being a predetermined coefficient), and the like. The position control unit 523 outputs a signal (the signal indicative of the target value (the command value) of the angular speed of the third drive source 403) to the subtractor 533 as the angular speed command ωc. Here, in the embodiment, a proportional control (P control) is used for the feedback control; however, the feedback control is not limited to the proportional control.

The angular speed calculation unit 563 calculates the angular speed of the third drive source 403 based on the frequency of pulse signals input from the third position sensor 413, and outputs the angular speed to the subtractor 533 as the angular speed feedback value ωfb.

The angular speed command ωc and the angular speed feedback value ωfb are input to the subtractor 533. The subtractor 533 outputs a deviation (a value being obtained by subtracting the angular speed feedback value ωfb from a target value of the angular speed of the third drive source 403) between the angular speed command ωc and the angular speed feedback value ωfb to the angular speed control unit 543.

The angular speed control unit 543 generates a drive signal (drive current) for the third drive source 403, which corresponds to the deviation, by performing predetermined computational processes (including integral calculus) using the deviation input from the subtractor 533, a proportional gain (the gain being a predetermined coefficient), an integral gain, and the like, and supplies the output to the motor 403M via the motor driver 303. Here, in the embodiment, PI control is used for the feedback control; however, the feedback control is not limited to the PI control.

The feedback control is performed and the drive current of the third drive source 403 is controlled in such a manner that the position feedback value Pfb becomes as equal to the position command Pc as possible, and the angular speed feedback value ωfb becomes as equal to the angular speed command ωc as possible.

Since the operation of each of the drive source control units 204 to 206 is the same as that of the third drive source control unit 203, a description thereof will be omitted.

As described above, in the robot 1 and the robot system 10, the first angular speed sensor 31 can detect the angular speed of the first arm 12, and the third turning axis O3 is parallel with the second turning axis O2, and thereby it is possible to detect the angular speed of the third arm 14, which includes an angular speed associated with a turning of the second arm 13, via the second angular speed sensor 32. It is possible to prevent an occurrence of vibration based on these detection results. In particular, since the first angular speed sensor unit 71 is disposed at the above-mentioned position, it is possible to detect the angular speed of a portion of the first arm 12 via the first angular speed sensor 31, the portion being subjected to large vibration, and thereby it is possible to more reliably prevent an occurrence of vibration.

Here, the first reason for being able to detect the angular speed of a portion (the portion being subjected to large vibration) of the first arm 12 via the first angular speed sensor 31 is that the rigidity of the root portion 251 is higher than that of the tongue-like portions 241a and 241b in the first arm 12, and the distal end side of the first arm 12 is subjected to vibration greater than the proximal end side, and thereby the tongue-like portions 241a and 241b are subjected to large vibration.

In addition, since the tongue-like portion 241a of the tongue-like portions 241a and 241b is provided with the speed reducer 45, the tongue-like portion 241a transmits a drive force to the second arm 13, and supports the second arm 13. For this reason, when the second arm 13 is driven, the tongue-like portion 241a is subjected to vibration greater than the tongue-like portion 241b.

In a view seen from the direction of the second turning axis O2, when the entirety of the first angular speed sensor unit 71 is not installed in a region in which the first arm 12 and the second arm 13 overlap with each other, and for example, the first angular speed sensor unit 71 is installed in the root portion 251, it is possible to detect the angular speed of the first arm 12, which includes a vibration component originating from the torsion of the first arm around the first turning axis O1, and in contrast, it is not possible to detect the angular speed that includes a vibration component originating from the bending of the first arm 12. However, in the robot 1 and the robot system 10, the first angular speed sensor unit 71 is installed in the tongue-like portion 241a, and thereby it is possible to detect the angular speed of the first arm 12, which includes a vibration component originating from the torsion of the first arm around the first turning axis O1, and a vibration component originating from the bending of the first arm 12, and it is possible to more reliably prevent an occurrence of vibration.

Even when the posture of the robot 1 is changed, the direction of the detecting axis 311 of the first angular speed sensor 31 remains constant. For this reason, it is not necessary to correct the angular speed (the angular speed being detected by the first angular speed sensor 31) of the first arm 12 for a change in the orientation of the first angular speed sensor 31.

Since the third turning axis O3 and the second turning axis O2 are orthogonal to the first turning axis O1 or are parallel with an axis orthogonal to the first turning axis O1, even when the posture of the robot 1 is changed, for example, the second arm 13 turns, or the third arm 14 turns, the direction of the detecting axis 321 of the second angular speed sensor 32 remains constant. For this reason, it is not necessary to correct the angular speed (the angular speed being detected by the second angular speed sensor 32) of the third arm 14 for a change in the orientation of the second angular speed sensor 32.

Accordingly, a large amount of complicated computational processing is not required, and thereby computational errors are unlikely to occur, it is possible to more reliably prevent an occurrence of vibration, and it is possible to increase the control response speed of the robot 1.

Since the second angular speed sensor 32 does not detect the angular speed of the second arm 13, but detects the angular speed of the third arm 14, which includes an angular speed associated with a turning of the second arm 13, it is possible to more reliably prevent an occurrence of vibration.

In addition, compared to when an angular speed sensor is also provided in the second arm 13, it is possible to reduce the number of angular speed sensors to be installed and to reduce costs, and the configuration can be simplified.

It is more effectively prevent the vibration of the robot 1 by controlling the operation of the second drive source 402 for turning the second arm 13 close to the proximal end side rather than the third arm 14.

As such, the robot and the robot system according to the invention are described based on the embodiment that is illustrated; however, the invention is not limited to the embodiment, and the configuration of each portion can be replaced with an arbitrary configuration having the same function. Other arbitrary configurations may be added to the invention.

A stepping motor or the like other than the servo motor may be used as the motor of each of the drive sources. For example, when a stepping motor is used as the motor, a position sensor may detect the rotational angle of the motor by measuring the number of drive pulses that are input to the stepping motor.

In addition, the type of each of the position sensor and the angular speed sensor is particularly limited, and for example, each of the position sensor and the angular speed sensor may be an optical sensor, a magnetic sensor, an electro-magnetic sensor, an electrical sensor, or the like.

In the embodiment, the operation of the second drive source for turning the second arm is controlled based on a detection result from the second angular speed sensor; however, the invention is not limited to a control strategy in the embodiment, and for example, the operation of the third drive source for turning the third arm may be controlled based on a detection result from the second angular speed sensor.

In the embodiment, the number of turning axes of the robot is six; but the invention is not limited to that in the embodiment, and for example, the number of turning axes may be two, three, four, five, or seven or greater.

That is, in the embodiment, since the wrist has two arms, the number of arms of the robot is six; however, the invention is not limited to that in the embodiment, for example, the number of arms of the robot may be two, three, four, five, or seven or greater.

In the embodiment, the robot is a single arm robot having a single robot arm that is formed of a plurality of arms turnably connected to each other; however, the invention is not limited to this configuration in the embodiment, and for example, may be a robot having a plurality of robot arms such as a dual arm robot having two robot arms, each of which is formed of a plurality of arms turnably connected to each other.

The entire disclosure of Japanese Patent Application No. 2014-057675, filed Mar. 20, 2014 is expressly incorporated by reference herein.

What is claimed is:

1. A robot comprising:
a base;
a first arm that is provided on the base so as to be able to turn around a first turning axis as the center of turning;
a second arm that is provided on the first arm so as to be able to turn around a second turning axis as the center of turning, the direction of which is different from the direction of the first turning axis; and
a first member that has a first angular speed detector,
wherein at least a part of the first member is provided in a region in which the first arm and the second arm overlap with each other when viewed along the direction of the second turning axis, and
wherein when seen from the direction of the first turning axis, the second turning axis is disposed at a position offset from the first turning axis.

2. The robot according to claim 1,
wherein the first arm has a first portion that is positioned closer to the base than the second arm, and a second portion that is positioned closer to the second arm than the base, and
wherein the first member is provided in the second portion.

3. The robot according to claim 2,
wherein a speed reducer is provided in the second portion.

4. The robot according to claim 2,
wherein the first portion and the second arm do not overlap with each other when seen from the direction of the second turning axis, and
wherein when seen from the direction of the second turning axis, the first member is provided in the second portion so as not to overlap the first portion.

5. The robot according to claim 1, further comprising:
a third arm that is provided on the second arm so as to be able to turn around a third turning axis as the center of turning, which is parallel with the second turning axis; and
a second member that is provided on the third arm, and has a second angular speed detector.

6. The robot according to claim 5,
wherein an angular speed detecting axis of the second angular speed detector is parallel with the third turning axis.

7. The robot according to claim 1,
wherein an angular speed detecting axis of the first angular speed detector is parallel with the first turning axis.

8. The robot according to claim 1,
wherein the first member is disposed inside the first arm.

9. The robot according to claim 1,
wherein the second turning axis is one of orthogonal to the first turning axis and parallel with an axis orthogonal to the first turning axis.

10. The robot according to claim 1, further comprising:
a fourth arm that is provided on the third arm so as to be able to turn around a fourth turning axis as the center of turning, which is orthogonal to the third turning axis, or is parallel with an axis orthogonal to the third turning axis;
a fifth arm that is provided on the fourth arm so as to be able to turn around a fifth turning axis as the center of turning, which is orthogonal to the fourth turning axis, or is parallel with an axis orthogonal to the fourth turning axis; and
a sixth arm that is provided on the fifth arm so as to be able to turn around a sixth turning axis as the center of turning, which is orthogonal to the fifth turning axis, or is parallel with an axis orthogonal to the fifth turning axis.

11. A robot system comprising:
a robot; and
a robot control device that controls the operation of the robot,
wherein the robot includes
a base,
a first arm that is provided on the base so as to be able to turn around a first turning axis as the center of turning,
a second arm that is provided on the first arm so as to be able to turn around a second turning axis as the center of turning, the direction of the second turning axis being different from the direction of the first turning axis, and
a member that has an angular speed detector,
wherein when seen from the direction of the second turning axis, at least a part of the member is provided in a region in which the first arm and the second arm overlap with each other, and
wherein when seen from the direction of the first turning axis, the second turning axis is disposed at a position offset from the first turning axis.

* * * * *